(12) United States Patent
Nagashima et al.

(10) Patent No.: US 12,549,833 B2
(45) Date of Patent: Feb. 10, 2026

(54) VEHICLE GLASS AND VEHICLE GLASS MANUFACTURING METHOD

(71) Applicant: AGC Inc., Tokyo (JP)

(72) Inventors: Tatsuo Nagashima, Tokyo (JP); Takafumi Inoue, Tokyo (JP); Kenji Kitaoka, Tokyo (JP)

(73) Assignee: AGC INC., Tokyo (JP)

( * ) Notice: Subject to any disclaimer, the term of this patent is extended or adjusted under 35 U.S.C. 154(b) by 246 days.

(21) Appl. No.: 18/217,462

(22) Filed: Jun. 30, 2023

(65) Prior Publication Data

US 2023/0345092 A1 Oct. 26, 2023

Related U.S. Application Data

(63) Continuation of application No. PCT/JP2021/043832, filed on Nov. 30, 2021.

(30) Foreign Application Priority Data

Jan. 8, 2021 (JP) ................................. 2021-002130

(51) Int. Cl.
*H04N 23/20* (2023.01)
*B60J 1/00* (2006.01)
*B60R 11/00* (2006.01)

(52) U.S. Cl.
CPC .............. *H04N 23/20* (2023.01); *B60J 1/001* (2013.01); *B60R 11/00* (2013.01); *B60R 2011/0026* (2013.01); *B60R 2011/0063* (2013.01)

(58) Field of Classification Search
CPC ... B32B 15/08; B32B 15/09; B32B 17/10005; B32B 17/10174; B32B 17/10678;
(Continued)

(56) References Cited

U.S. PATENT DOCUMENTS 9,913,319 B2 3/2018 Timmermann et al.
2003/0169491 A1* 9/2003 Bender ................. H04N 23/20
359/356
(Continued)

FOREIGN PATENT DOCUMENTS

CN 104160779 A 11/2014
CN 109890611 A 6/2019
(Continued)

OTHER PUBLICATIONS

International Searching Authority, "International Search Report," issued in connection with International Patent Application No. PCT/JP2021/043832, dated Feb. 8, 2022.
(Continued)

*Primary Examiner* — Masum Billah
(74) *Attorney, Agent, or Firm* — Foley & Lardner LLP

(57) ABSTRACT

A colliding object is suppressed from reaching a driver's seat, and an occupant and an object in a vehicle compartment are suppressed from being thrown out of a vehicle. In a vehicle glass 1, a far-infrared transmitting region in which an opening portion and a far-infrared transmissive member 20 arranged in the opening portion are provided is formed in a light shielding region. The vehicle glass 1 includes a protective member 40 that is provided on a vehicle interior side of the far-infrared transmissive member 20 and overlaps with at least a part of the far-infrared transmissive member 20 when viewed from a direction orthogonal to a vehicle exterior side surface 20a of the far-infrared transmissive member 20.

20 Claims, 11 Drawing Sheets

(58) Field of Classification Search
CPC ........ B32B 17/10743; B32B 17/10761; B32B 17/10788; B32B 2250/05
USPC .......................................................... 348/148
See application file for complete search history.

(56) References Cited

U.S. PATENT DOCUMENTS

| | | |
|---|---|---|
| 2004/0160688 A1 | 8/2004 | Noguchi et al. |
| 2006/0250711 A1* | 11/2006 | Noguchi ........... B32B 17/10293 359/900 |
| 2007/0216768 A1 | 9/2007 | Smith et al. |
| 2015/0034621 A1* | 2/2015 | Timmermann ........... H05B 3/84 219/203 |
| 2020/0238663 A1* | 7/2020 | Wessberg .......... B32B 17/10761 |
| 2022/0132047 A1 | 4/2022 | Nagashima et al. |
| 2024/0323550 A1 | 9/2024 | Nagashima et al. |

FOREIGN PATENT DOCUMENTS

| | | | |
|---|---|---|---|
| EP | 3 988 511 A1 | 4/2022 | |
| GB | 2271139 A * | 4/1994 | ....... B32B 17/10036 |
| JP | H01-154486 U | 10/1989 | |
| JP | 2006327381 A * | 12/2006 | ....... B32B 17/10036 |
| JP | 2015-509458 A | 3/2015 | |
| JP | 2020-536035 A | 12/2020 | |
| WO | WO-03/059837 A | 7/2003 | |

OTHER PUBLICATIONS

International Searching Authority, "Written Opinion," issued in connection with International Patent Application No. PCT/JP2021/043832, dated Feb. 8, 2022.

* cited by examiner

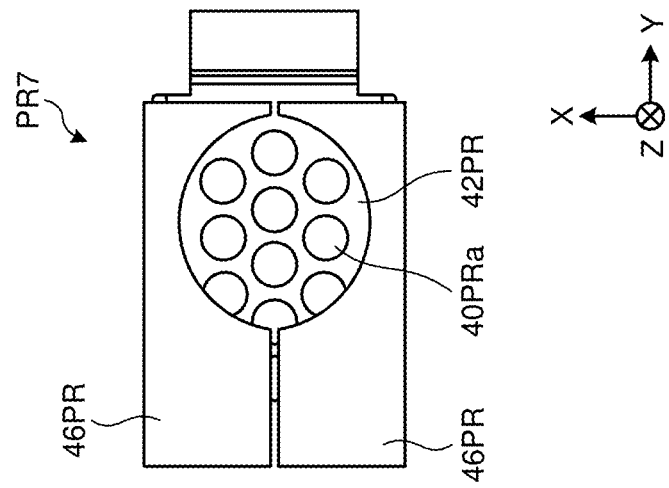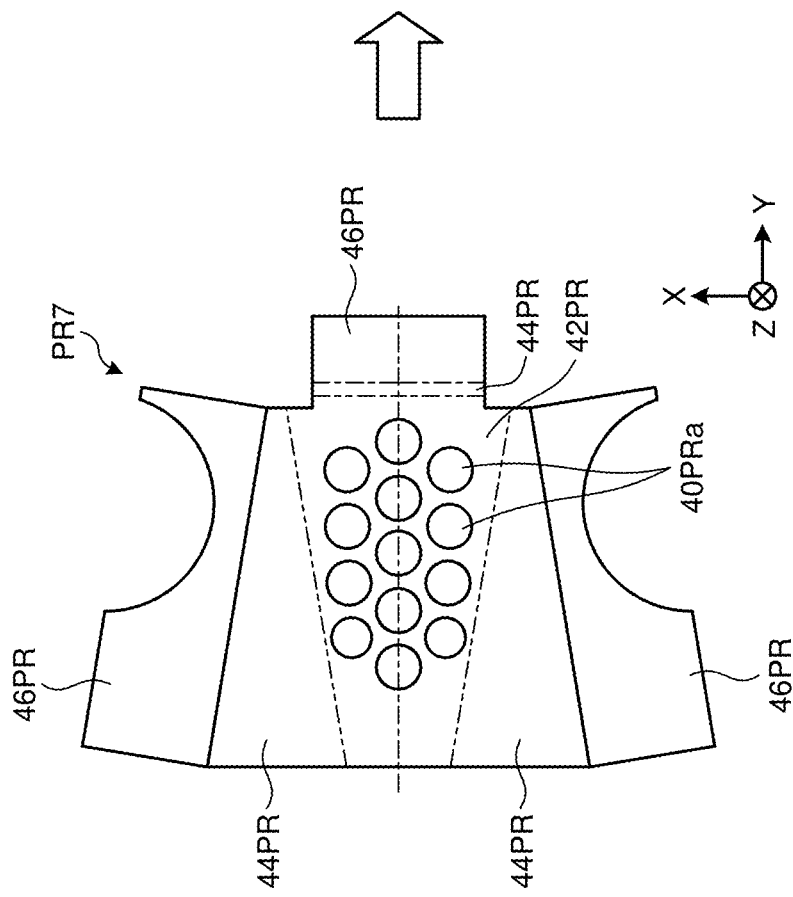

VEHICLE GLASS AND VEHICLE GLASS MANUFACTURING METHOD

CROSS-REFERENCE TO RELATED APPLICATIONS

This application is a Bypass Continuation of International Application No. PCT/JP2021/043832, filed on Nov. 30, 2021, which claims priority to Japanese Patent Application No. 2021-002130, filed on Jan. 8, 2021. The entire contents of which are incorporated herein by reference.

FIELD

The present invention relates to a vehicle glass and a vehicle glass manufacturing method.

BACKGROUND

In recent years, various sensors may be attached for the purpose of improving the safety of an automobile. Examples of the sensor attached to an automobile include a camera, light detection and ranging (LiDAR), a millimeter wave radar, and an infrared sensor.

Infrared rays are classified into near-infrared rays (for example, a wavelength of 0.7 µm to 2 µm), mid-infrared rays (for example, a wavelength of 3 µm to 5 µm), and far-infrared rays (for example, a wavelength of 8 µm to 13 µm) depending on the wavelength bands. Examples of the infrared sensor that detects these infrared rays include a touch sensor, a near-infrared camera, and LiDAR for the near-infrared rays, gas analysis and mid-infrared spectroscopic analysis (functional group analysis) for the mid-infrared rays, and night vision and a thermoviewer (hereinafter, referred to as a far-infrared camera) for the far-infrared rays.

Since a window glass of an automobile usually does not transmit far-infrared rays having a wavelength of 8 µm to 13 µm, the far-infrared camera is conventionally installed outside a vehicle compartment, more specifically, in a radiator grille as in Patent Literature 1, for example. However, in a case where the far-infrared camera is installed outside the vehicle compartment, the structure becomes more complicated in order to ensure robustness, water resistance, dust resistance, and the like, which leads to high cost. As the far-infrared camera is installed in the vehicle compartment and in an operating area of a wiper, the far-infrared camera is protected by the window glass, and thus, such a problem can be solved. However, as described above, since the window glass has a problem of low far-infrared transmittance, the far-infrared camera is not usually arranged in the vehicle compartment.

In order to meet the above requirements, Patent Literature 2 discloses a window member in which a through hole is formed in a part of a window glass and the through hole is filled with an infrared transmissive member.

CITATION LIST

Patent Literature

Patent Literature 1: US 2003/0169491 A
Patent Literature 2: GB 2271139 A

SUMMARY

Technical Problem

Here, the window glass generally has a structure in which a colliding object hardly penetrates even when colliding with the colliding object, and a far-infrared transmissive member is provided in a through hole formed in the window glass. Therefore, when the colliding object collides with the far-infrared transmissive member, there is a possibility that the colliding object penetrates through the far-infrared transmissive member and reaches passenger seats including a driver's seat on a vehicle interior side. Therefore, it is required to suppress the colliding object from reaching the passenger seat.

In addition, it is required to prevent an occupant or an object on the vehicle interior side from penetrating through a window portion and being thrown out of the vehicle at the time of vehicle collision.

The present invention has been made in view of the above problems, and an object of the present invention is to provide a vehicle glass and a vehicle glass manufacturing method capable of suppressing a colliding object from reaching a driver's seat and suppressing an occupant or an object in a vehicle compartment from being thrown out of a vehicle.

Solution to Problem

To solve the problem above, a vehicle glass of the present disclosure comprises: a light shielding region, wherein a far-infrared transmitting region in which an opening portion and a far-infrared transmissive member arranged in the opening portion are provided is formed in the light shielding region, and the vehicle glass further comprises a protective member that is provided on a vehicle interior side of the far-infrared transmissive member and overlaps with at least a part of the far-infrared transmissive member when viewed from a direction orthogonal to a vehicle exterior side surface of the far-infrared transmissive member.

To solve the problem above, a vehicle glass manufacturing method of the present disclosure comprises: boring an opening portion that penetrates through each of a first glass substrate and a second glass substrate in a thickness direction; chamfering a boundary portion between the opening portion and a vehicle interior side surface of the first glass substrate, a boundary portion between the opening portion and a vehicle exterior side surface of the first glass substrate, a boundary portion between the opening portion and a vehicle interior side surface of the second glass substrate, and a boundary portion between the opening portion and a vehicle exterior side surface of the second glass substrate; positioning the opening portion of the first glass substrate and the opening portion of the second glass substrate, and then bonding the first glass substrate and the second glass substrate with an intermediate layer interposed therebetween to obtain a laminated glass; installing a far-infrared transmissive member in the opening portion; and installing a protective member overlapping with at least a part of the far-infrared transmissive member when viewed from a direction orthogonal to a vehicle exterior side surface of the far-infrared transmissive member on a vehicle interior side of the far-infrared transmissive member.

Advantageous Effects of Invention

According to the present invention, it is possible to prevent a colliding object from reaching a driver's seat and to prevent an occupant or an object in a vehicle compartment from being thrown out of a vehicle.

BRIEF DESCRIPTION OF DRAWINGS

FIGS. 11A and 11B are schematic views illustrating one aspect of the protective member.

DESCRIPTION OF EMBODIMENTS

Hereinafter, preferred embodiments of the present invention will be described in detail with reference to the accompanying drawings. Note that the present invention is not limited by the embodiments, and in a case where there are a plurality of embodiments, the present invention includes a combination of the embodiments. Numerical values include a range of rounding.

(Vehicle)

Figure 1:
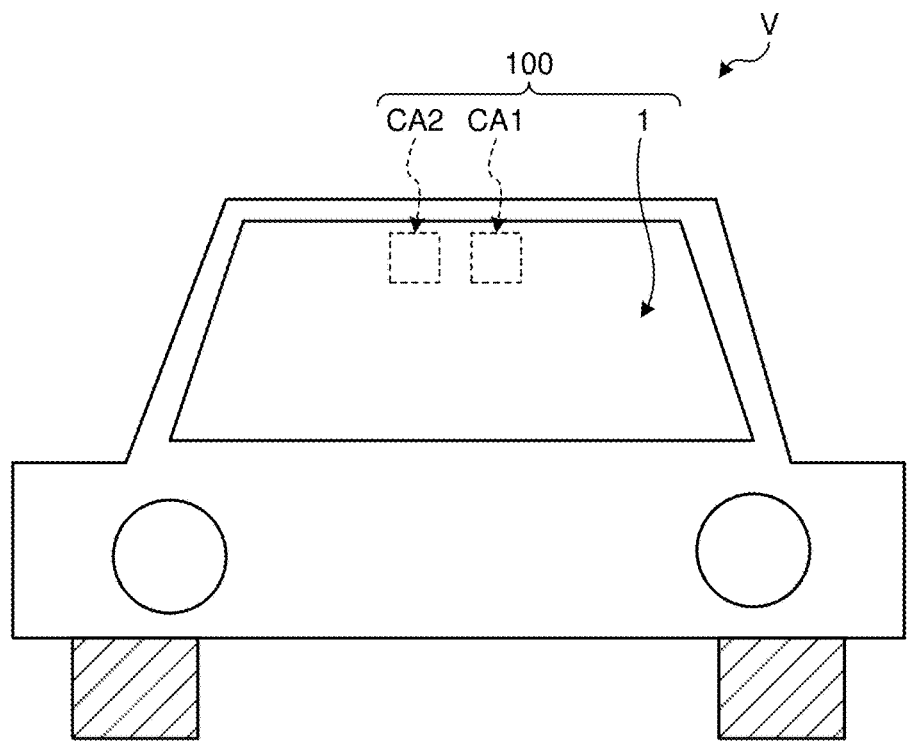
FIG. 1 is a schematic view illustrating a state in which a vehicle glass according to the present embodiment is mounted on a vehicle.

FIG. 1 is a schematic view illustrating a state in which a vehicle glass according to the present embodiment is mounted on a vehicle. As illustrated in FIG. 1, a vehicle glass 1 according to the present embodiment is mounted on a vehicle V. The vehicle glass 1 is a window member applied to a windshield of the vehicle V. That is, the vehicle glass 1 is used as the windshield of the vehicle V, in other words, as a windshield glass. A far-infrared camera CA1 and a visible light camera CA2 are mounted inside (vehicle interior) the vehicle V. The inside of the vehicle V (vehicle interior) refers to, for example, the inside of a vehicle compartment in which a driver's seat is provided.

The vehicle glass 1, the far-infrared camera CA1, and the visible light camera CA2 are included in a camera unit 100 according to the present embodiment. The far-infrared camera CA1 is a camera that detects far-infrared rays, and captures a thermal image of the outside of the vehicle V by detecting far-infrared rays from the outside of the vehicle V. The visible light camera CA2 is a camera that detects visible light, and captures an image of the outside of the vehicle V by detecting visible light from the outside of the vehicle V. The camera unit 100 may further include, for example, LiDAR or a millimeter wave radar in addition to the far-infrared camera CA1 and the visible light camera CA2. Here, the far-infrared ray is, for example, electromagnetic waves having a wavelength of 8 μm to 13 μm, and the visible light is, for example, electromagnetic waves having a wavelength of 360 nm to 830 nm. The far-infrared ray may be electromagnetic waves having a wavelength of 8 μm to 12 μm. In addition, a numerical range represented using "to" means a range including numerical values described before and after "to" as a lower limit value and an upper limit value.

(Vehicle Glass)

Figure 2:
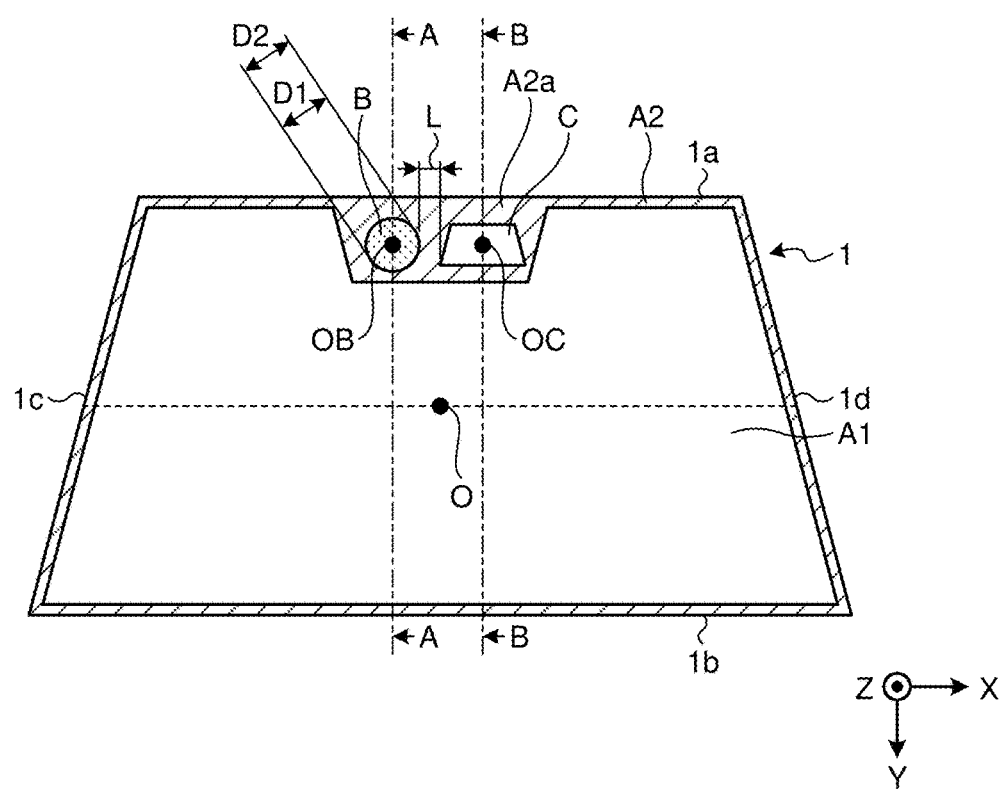
FIG. 2 is a schematic plan view of the vehicle glass according to the present embodiment.
Figure 3A:
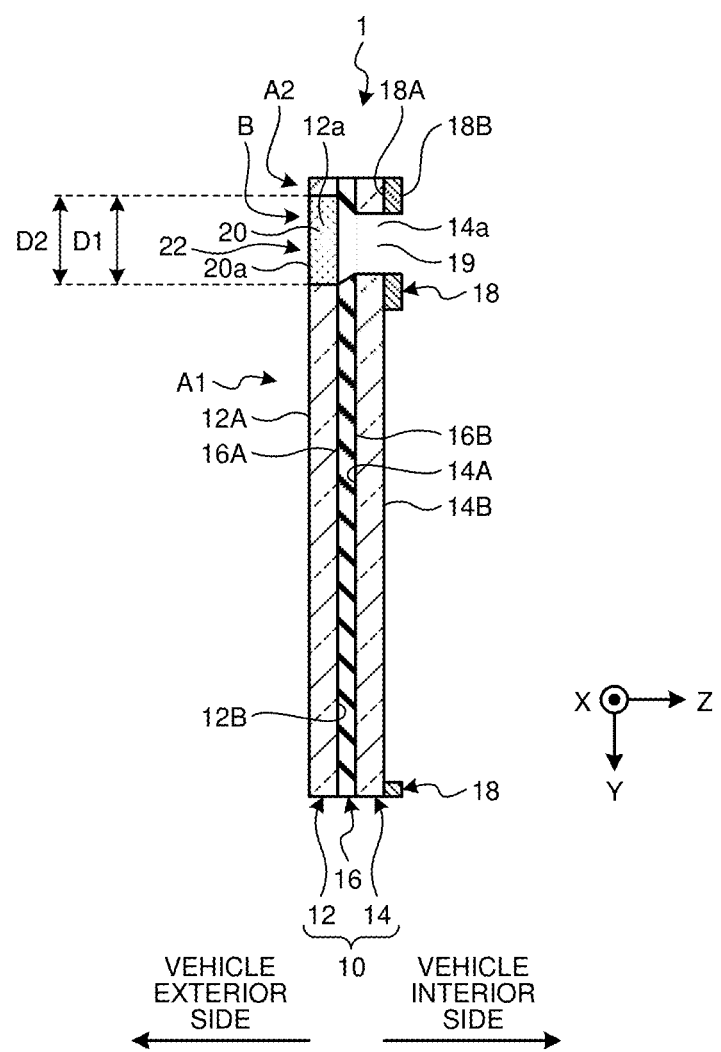
FIG. 3A is a cross-sectional view taken along line A-A of FIG. 2.
Figure 3B:
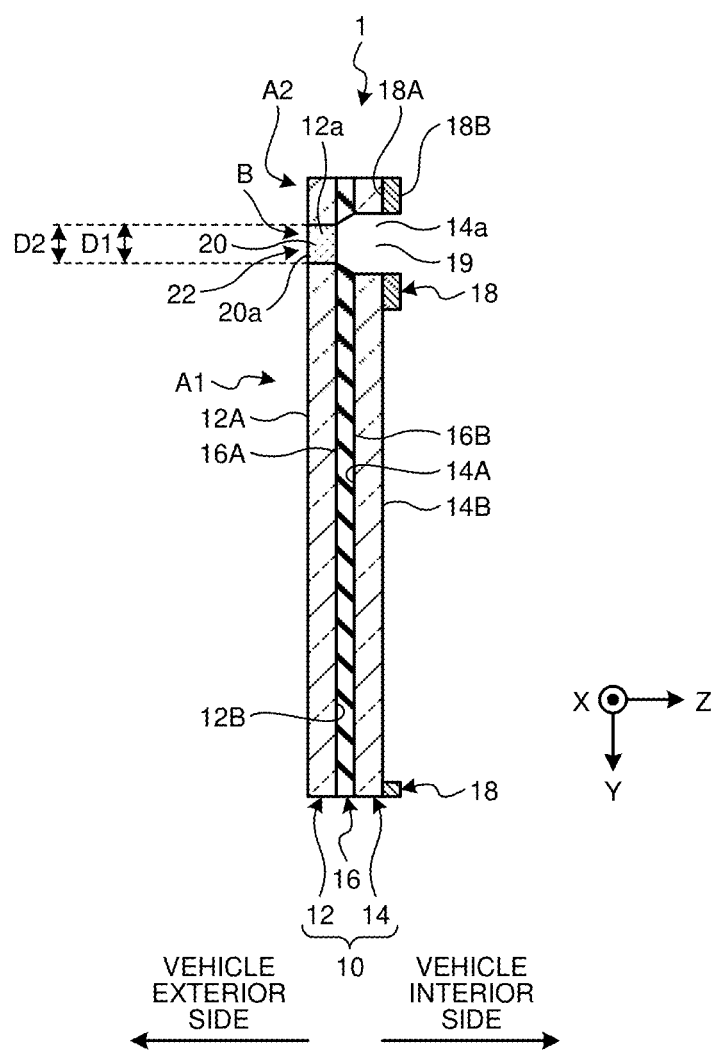
FIG. 3B is a cross-sectional view taken along line A-A of FIG. 2.
Figure 4:
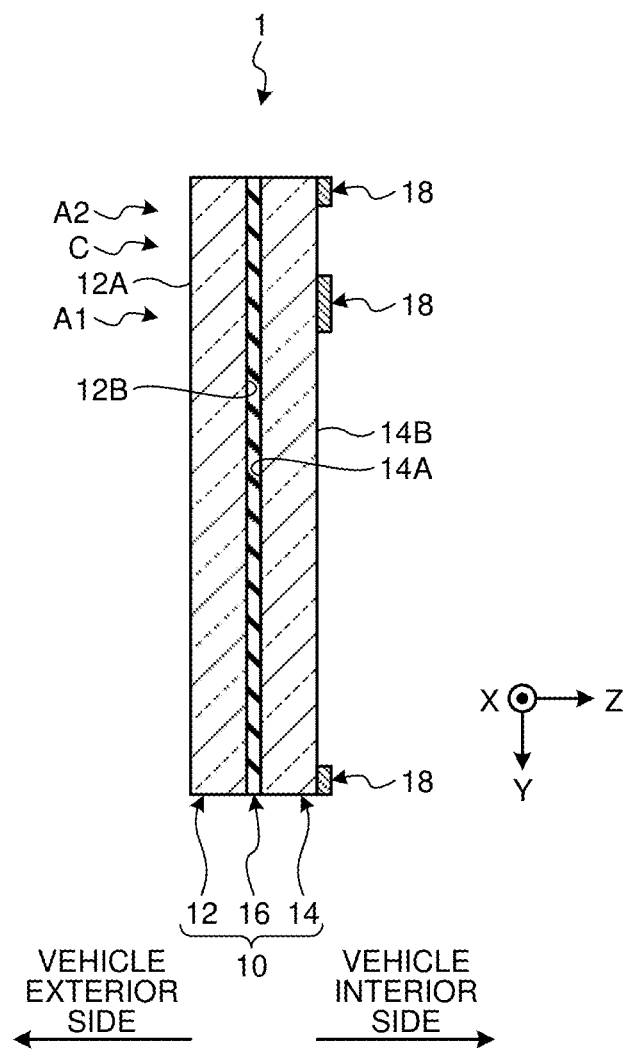
FIG. 4 is a cross-sectional view taken along line B-B of FIG. 2.

FIG. 2 is a schematic plan view of the vehicle glass according to the present embodiment. FIGS. 3A and 3B are cross-sectional views taken along line A-A of FIG. 2. FIG. 3A is a cross-sectional view in a case where a glass opening dimension of a vehicle exterior surface is larger than an opening dimension of a vehicle interior surface, and FIG. 3B is a cross-sectional view in a case where the glass opening dimension of the vehicle interior surface is larger than the opening dimension of the vehicle exterior surface. FIG. 4 is a cross-sectional view taken along line B-B of FIG. 2. As illustrated in FIG. 2, hereinafter, an upper edge of the vehicle glass 1 is referred to as an upper edge portion 1a, a lower edge is referred to as a lower edge portion 1b, one side edge is referred to as a side edge portion 1c, and the other side edge is referred to as a side edge portion 1d. The upper edge portion 1a is an edge portion positioned on a vertically upper side when the vehicle glass 1 is mounted on the vehicle V. The lower edge portion 1b is an edge portion positioned on a vertically lower side when the vehicle glass 1 is mounted on the vehicle V. The side edge portion 1c is an edge portion positioned on one side when the vehicle glass 1 is mounted on the vehicle V. The side edge portion 1d is an edge portion positioned on the other side when the vehicle glass 1 is mounted on the vehicle V.

Hereinafter, among directions parallel to a surface of the vehicle glass 1, a direction from the upper edge portion 1a toward the lower edge portion 1b is referred to as a Y direction, and a direction from the side edge portion 1c toward the side edge portion 1d is referred to as an X direction. In the present embodiment, the X direction and the Y direction are orthogonal to each other. A direction orthogonal to the surface of the vehicle glass 1, that is, a thickness direction of the vehicle glass 1, is referred to as a Z direction. The Z direction is, for example, a direction from a vehicle exterior side of the vehicle V toward a vehicle interior side when the vehicle glass 1 is mounted on the vehicle V. The X direction and the Y direction are along the surface of the vehicle glass 1, but for example, in a case where the surface of the vehicle glass 1 is a curved surface, the X direction and the Y direction may be directions tangent to the surface of the vehicle glass 1 at a center point O of the vehicle glass 1. The center point O is a center position of the vehicle glass 1 when the vehicle glass 1 is viewed from the Z direction.

A light transmitting region A1 and a light shielding region A2 are formed in the vehicle glass 1. The light transmitting region A1 is a region occupying a central portion of the vehicle glass 1 when viewed from the Z direction. The light transmitting region A1 is a region for securing a visual field of a driver. The light transmitting region A1 is a region that transmits visible light. The light shielding region A2 is a region formed around the light transmitting region A1 when viewed from the Z direction. The light shielding region A2 is a region that shields visible light. In the light shielding region A2, a far-infrared transmitting region B and a visible light transmitting region C are formed in a light shielding region A2a which is a portion adjacent to the upper edge portion 1a.

The far-infrared transmitting region B is a region that transmits far-infrared rays and is a region where the far-infrared camera CA1 is provided. That is, the far-infrared camera CA1 is provided at a position overlapping the far-infrared transmitting region B when viewed from an optical axis direction of the far-infrared camera CA1. The visible light transmitting region C is a region that transmits visible light and is a region where the visible light camera CA2 is provided. That is, the visible light camera CA2 is provided at a position overlapping the visible light transmitting region C when viewed from an optical axis direction of the visible light camera CA2.

As described above, since the far-infrared transmitting region B and the visible light transmitting region C are formed in the light shielding region A2, the light shielding region A2 shields far-infrared rays in a region other than the region where the far-infrared transmitting region B is formed, and shields visible light in a region other than the region where the visible light transmitting region C is formed. The light shielding region A2a is formed around the far-infrared transmitting region B and the visible light transmitting region C. As the light shielding region A2a is provided around as described above, various sensors are protected from sunlight, which is preferable. Wiring of the various sensors is not visible from the outside of the vehicle, and thus it is preferable from the viewpoint of designability.

As illustrated in FIGS. 3A and 3B, the vehicle glass 1 includes a glass substrate 12 (first glass substrate), a glass substrate 14 (second glass substrate), an intermediate layer 16, and a light shielding layer 18. In the vehicle glass 1, the glass substrate 12, the intermediate layer 16, the glass substrate 14, and the light shielding layer 18 are laminated in this order in the Z direction. The glass substrate 12 and the glass substrate 14 are fixed (bonded) to each other with the intermediate layer 16 interposed therebetween.

As the glass substrates 12 and 14, for example, soda-lime glass, borosilicate glass, aluminosilicate glass, or the like can be used. The intermediate layer 16 is an adhesive layer for adhering the glass substrate 12 and the glass substrate 14. As the intermediate layer 16, for example, a polyvinyl butyral (hereinafter, also referred to as PVB)-modified material, an ethylene-vinyl acetate copolymer (EVA)-based material, a urethane resin material, a vinyl chloride resin material, or the like can be used. More specifically, the glass substrate 12 has one surface 12A and the other surface 12B and is fixed (bonded) to the intermediate layer 16 in such a way that the other surface 12B is in contact with one surface 16A of the intermediate layer 16. The glass substrate 14 has one surface 14A and the other surface 14B and is fixed (bonded) to the intermediate layer 16 in such a way that the one surface 14A is in contact with the other surface 16B of the intermediate layer 16. As described above, the vehicle glass 1 is a laminated glass in which the glass substrate 12 and the glass substrate 14 are laminated. However, the vehicle glass 1 is not limited to a laminated glass, and may include, for example, only one of the glass substrate 12 and the glass substrate 14. In this case, the intermediate layer 16 does not have to be provided either. Hereinafter, when the glass substrates 12 and 14 need not be distinguished from each other, the glass substrates 12 and 14 are referred to as a glass substrate 10.

The light shielding layer 18 has one surface 18A and the other surface 18B, and the one surface 18A is in contact with and fixed to the other surface 14B of the glass substrate 14.

The light shielding layer 18 is a layer that shields visible light and is preferably a layer that shields visible light and ultraviolet light. As the light shielding layer 18, for example, a ceramic light shielding layer or a light shielding film can be used. As the ceramic light shielding layer, for example, a ceramic layer made of a conventionally known material such as a black ceramic layer can be used. As the light shielding film, for example, a light shielding polyethylene terephthalate (PET) film, a light shielding polyethylene naphthalate (PEN) film, a light shielding polymethyl methacrylate (PMMA) film, or the like can be used.

In the present embodiment, in the vehicle glass 1, a side on which the light shielding layer 18 is provided is an interior side (vehicle interior side) of the vehicle V, and a side on which the glass substrate 12 is provided is an exterior side (vehicle exterior side) of the vehicle V. However, the present invention is not limited thereto, and the light shielding layer 18 may be provided on the exterior side of the vehicle V. In a case where the glass substrates 12 and 14 are implemented by laminated glasses, the light shielding layer 18 may be formed between the glass substrate 12 and the glass substrate 14.

(Light Shielding Region)

The light shielding region A2 is formed by providing the light shielding layer 18 on the glass substrate 10. That is, the light shielding region A2 is a region in which the glass substrate 10 includes the light shielding layer 18. That is, the light shielding region A2 is a region in which the glass substrate 12, the intermediate layer 16, the glass substrate 14, and the light shielding layer 18 are laminated. On the other hand, the light transmitting region A1 is a region in which the glass substrate 10 does not include the light shielding layer 18. That is, the light transmitting region A1 is a region in which the glass substrate 12, the intermediate layer 16, and the glass substrate 14 are laminated and the light shielding layer 18 is not laminated.

(Far-Infrared Transmitting Region)

As illustrated in FIGS. 3A and 3B, the vehicle glass 1 has an opening portion 19 penetrating from one surface (here, the surface 12A) to the other surface (here, the surface 14B) in the Z direction. A far-infrared transmissive member 20 is provided in the opening portion 19. A region where the opening portion 19 is formed and the far-infrared transmissive member 20 is provided is the far-infrared transmitting region B. That is, the far-infrared transmitting region B is a region where the opening portion 19 and the far-infrared transmissive member 20 arranged in the opening portion 19 are provided. Since the light shielding layer 18 does not transmit far-infrared rays, the light shielding layer 18 is not provided in the far-infrared transmitting region B. That is, in the far-infrared transmitting region B, the glass substrate 12, the intermediate layer 16, the glass substrate 14, and the light shielding layer 18 are not provided, and the far-infrared transmissive member 20 is provided in the formed opening portion 19. The far-infrared transmissive member 20 will be described below. It can be said that the vehicle glass 1 includes the glass substrate 10 and the far-infrared transmissive member 20 provided in the opening portion 19 of the glass substrate 10. The glass substrate 10 can also be referred to as a window glass portion in the vehicle glass 1. For example, here, a configuration including the glass substrates 12 and 14, the intermediate layer 16, and the light shielding layer 18 may be referred to as the glass substrate 10. However, as described above, the glass substrate 10 may include at least one of the glass substrate 12 or the glass substrate 14.

(Visible Light Region)

As illustrated in FIG. 4, the visible light transmitting region C is a region in which the glass substrate 10 does not include the light shielding layer 18 in the Z direction, similarly to the light transmitting region A1. That is, the visible light transmitting region C is a region where the glass substrate 12, the intermediate layer 16, and the glass substrate 14 are laminated, and the light shielding layer 18 is not laminated.

As illustrated in FIG. 2, the visible light transmitting region C is preferably provided in the vicinity of the far-infrared transmitting region B. Specifically, the center of the far-infrared transmitting region B when viewed from the Z direction is defined as a center point OB, and the center of the visible light transmitting region C when viewed from the Z direction is defined as a center point OC. When the shortest distance between the far-infrared transmitting region B (opening portion 19) and the visible light transmitting region C when viewed from the Z direction is defined as a distance L, the distance L is preferably more than 0 mm and 100 mm or less, and more preferably 10 mm or more and 80 mm or less. Although not illustrated here, in a case where there are a plurality of visible light transmitting regions C, the distance L indicates a relationship with one of the plurality of visible light transmitting regions C. As the visible light transmitting region C is positioned within the range from the far-infrared transmitting region B, the far-infrared camera CA1 and the visible light camera CA2 can capture images of close positions, and it is possible to appropriately capture an image by the visible light camera CA2 while suppressing the amount of perspective distortion in the visible light transmitting region C. As the far-infrared camera CA1 and the visible light camera CA2 capture images of close positions, a load at the time of executing arithmetic processing on data obtained from each camera is reduced, and handling of a power supply and a signal cable also becomes suitable.

As illustrated in FIG. 2, the visible light transmitting region C and the far-infrared transmitting region B are preferably positioned side by side in the X direction. That is, it is preferable that the visible light transmitting region C is not positioned on a Y direction side of the far-infrared transmitting region B and is arranged side by side with the far-infrared transmitting region B in the X direction. As the visible light transmitting region C is arranged side by side with the far-infrared transmitting region B in the X direction, parallax between the far-infrared camera and the visible light camera can be reduced as much as possible, an object recognition rate for a target is improved, and the visible light transmitting region C can be arranged in the vicinity of the upper edge portion 1a. Therefore, a visual field of the driver in the light transmitting region A1 can be appropriately secured. Here, being positioned side by side in the X direction means being within a range of +50 mm with respect to the Y direction.

(Infrared Transmissive Member)

Hereinafter, the far-infrared transmissive member 20 provided in the far-infrared transmitting region B will be specifically described. The far-infrared transmissive member 20 is a member that transmits far-infrared rays. As illustrated in FIGS. 3A and 3B, the far-infrared transmissive member 20 is preferably formed in such a way that a surface on the vehicle exterior side is flush (continuous) with a surface of the light shielding region A2 on the vehicle exterior side. In other words, a vehicle exterior side surface 20a of the far-infrared transmissive member 20 is attached in such a way as to be continuous with the surface 12A of the glass substrate 12. As described above, the surface 20a of the far-infrared transmissive member 20 is continuous with the surface 12A of the glass substrate 12, so that a wiping effect of the wiper can be suppressed from being impaired. In addition, it is possible to suppress a risk that the design of the vehicle V is impaired due to the presence of a step, or dust or the like accumulates on the step. Furthermore, the far-infrared transmissive member 20 is preferably molded in accordance with a curved surface shape of the applied vehicle glass 1. A method for molding the far-infrared transmissive member 20 is not particularly limited, but polishing or molding is selected according to the curved surface shape or the member.

The shape of the far-infrared transmissive member 20 is not particularly limited, but is preferably a plate-like shape matching the shape of the opening portion 19. That is, for example, when the opening portion 19 is circular, the far-infrared transmissive member 20 preferably has a disk shape (cylindrical shape). In addition, from the viewpoint of designability, the vehicle exterior side surface of the far-infrared transmissive member 20 may be processed to have a shape matching a curvature of an outer surface shape of the glass substrate 12. Furthermore, the far-infrared transmissive member 20 may have a lens shape for the reason of achieving both an increase in viewing angle of the far-infrared camera CA1 and improvement of mechanical characteristics. Such a configuration is preferable because far-infrared light can be efficiently condensed even if the area of the far-infrared transmissive member 20 is small. In this case, the number of lens-shaped far-infrared transmissive members 20 is preferably one to three, and typically preferably two. Further, it is particularly preferable that the lens-shaped far-infrared transmissive member 20 is aligned in advance and modularized, and is integrated with a housing or a bracket for bonding the far-infrared camera CA1 to the vehicle glass 1.

In the vehicle glass 1 of the present embodiment, as a configuration example of the opening portion 19, it is preferable that the area of the opening portion 19 in the vehicle interior side surface is smaller than the area of the opening portion 19 in the vehicle exterior side surface as illustrated in FIG. 3A. With such a configuration, strength against an impact from the outside of the vehicle is improved. In this case, the shape of the far-infrared transmissive member 20 may match with the opening portion 19 on the vehicle exterior side. Furthermore, in a case where the vehicle glass 1 of the present embodiment is a laminated glass including the glass substrate 12 (vehicle exterior side) and the glass substrate 14 (vehicle interior side), the opening portion 19 is formed in such a way that an opening portion 12a of the glass substrate 12 and an opening portion 14a of the glass substrate 14 overlap each other. In this case, it is sufficient if the area of the opening portion 12a of the glass substrate 12 is made larger than the area of the opening portion 14a of the glass substrate 14, and the far-infrared transmissive member 20 having a size matching the size of the opening portion 12a of the glass substrate 12 is arranged in the opening portion 12a of the glass substrate 12. The structure of FIG. 3A can be implemented, for example, by processing the opening portion 12a of the glass substrate 12 and the opening portion 14a of the glass substrate 14 to have accurate positions and sizes and stacking the glass substrates 12 and 14 in such a way as to reduce positional deviation.

Figure 5:
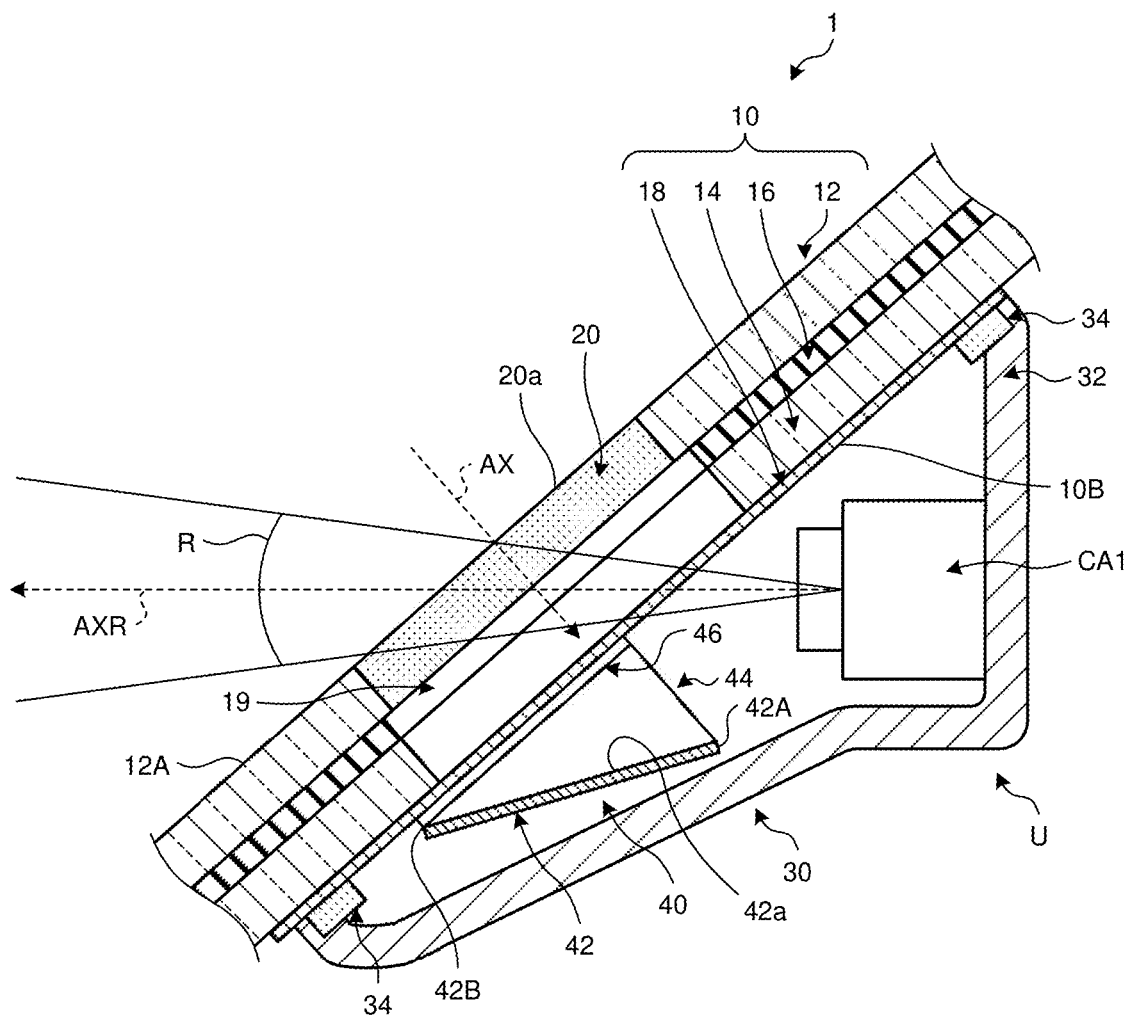
FIG. 5 is a schematic view illustrating an example of a state in which the vehicle glass is attached to the vehicle.

As an example of the opening portion 19, as illustrated in FIGS. 3B and 5, the area of the opening portion 19 in the vehicle exterior side surface may be smaller than the area of the opening portion 19 on the vehicle interior side. In this case, the shape of the far-infrared transmissive member 20 may match with the opening portion 19 on the vehicle exterior side. Furthermore, in a case where the vehicle glass 1 of the present embodiment is a laminated glass including the glass substrate 12 (vehicle exterior side) and the glass substrate 14 (vehicle interior side), the opening portion 19 is formed in such a way that an opening portion 12a of the glass substrate 12 and an opening portion 14a of the glass substrate 14 overlap each other. In this case, it is sufficient if the area of the opening portion 14a of the glass substrate 14 is made larger than the area of the opening portion 12a of the glass substrate 12, and the far-infrared transmissive member 20 having a size matching the size of the opening portion 12a of the glass substrate 12 is arranged in the opening portion 12a of the glass substrate 12. In such a configuration, it is preferable that a rotational axis deviation (referred to as center position deviation for convenience) between a central axis of the opening portion 12a formed in the glass substrate 12 and the opening portion 14a formed in the glass substrate 14 and a glass surface is as small as possible from the viewpoint that an outer peripheral width of a frame member 52 to be described below can be decreased to obtain a preferable appearance, and the area of the opening portion 19 of the far-infrared transmissive member 20 can be increased.

In addition, as illustrated in FIGS. 3A and 3B, in the far-infrared transmissive member 20, a length D1 of the longest straight line among straight lines connecting arbitrary two points in the vehicle exterior side surface is preferably 100 mm or less. The length D1 is more preferably 80 mm or less. The length D1 is still more preferably 60 mm or less, and particularly preferably 55 mm or less. Further, the length D1 is preferably 45 mm or more. It can be said that the length D1 is preferably 45 mm or more and 100 mm or less, more preferably 45 mm or more and 80 mm or less, more preferably 45 mm or more and 60 mm or less, and more preferably 45 mm or more and 55 mm or less. Further, as illustrated in FIG. 3A, in the opening portion 19 of the far-infrared transmitting region B, a length D2 of the longest straight line among straight lines connecting arbitrary two points in the vehicle exterior side surface (here, arbitrary two points on an edge of an opened portion of the opening portion 19 that is adjacent to the surface 12A) is preferably 110 mm or less. The length D2 is more preferably 85 mm or less, still more preferably 65 mm or less, and particularly preferably 60 mm or less. Further, the length D2 is preferably 50 mm or more. It can be said that the length D2 is preferably 50 mm or more and 110 mm or less, more preferably 50 mm or more and 85 mm or less, more preferably 50 mm or more and 65 mm or less, and more preferably 50 mm or more and 60 mm or less. The length D2 can also be said to be a length of the longest straight line among straight lines connecting any two points on an outer periphery of the opening portion 19 in the vehicle exterior side surface (surface 12A) of the vehicle glass 1. As the length D1 of the far-infrared transmissive member 20 and the length D2 of the opening portion 19 are set within the ranges, it is possible to suppress a decrease in strength of the vehicle glass 1 and also suppress the amount of perspective distortion around the opening portion 19. The lengths D1 and D2 are lengths corresponding to a diameter of the vehicle exterior side surface in a case where the shape of the vehicle exterior side surface of the far-infrared transmissive member 20 is circular. In addition, the lengths D1 and D2 here indicate lengths in a state where the vehicle glass 1 is mounted on the vehicle V. For example, in a case where the glass is subjected to bending and mounted on the vehicle V, the lengths D1 and D2 are lengths after the bending. The same applies to the description of dimensions and positions other than the lengths D1 and D2 unless otherwise specified.

The far-infrared transmissive member 20 includes a base material 22 which is a member capable of transmitting far-infrared rays. The base material 22 has an internal transmittance of preferably 50% or more, more preferably 60% or more, still more preferably 70% or more with respect to light having a wavelength of 10 μm (far-infrared rays). In addition, the base material 22 has an average internal transmittance of preferably 50% or more, more preferably 60% or more, and still more preferably 70% or more with respect to light having a wavelength of 8 μm to 13 μm (far-infrared rays). As the internal transmittance of the base material 22 at 10 μm and the average internal transmittance of the base material 22 at 8 μm to 13 μm fall within the numerical ranges, far-infrared rays can be appropriately transmitted, and for example, the performance of the far-infrared camera CA1 can be sufficiently exhibited. Here, the average internal transmittance is an average value of internal transmittances with respect to the light of each wavelength in the wavelength band (here, 8 μm to 12 μm).

The internal transmittance of the base material 22 is a transmittance excluding surface reflection losses on an incident side and an emission side, and is well known in the art. The internal transmittance may be measured by a general method. The measurement is performed, for example, as follows.

A pair of plate-like samples (a first sample and a second sample) made of a base material having the same composition and having different thicknesses is prepared. The plate-like sample has optically polished flat opposite surfaces that are parallel to each other. Assuming that an external transmittance including a surface reflection loss of the first sample is T1, an external transmittance including a surface reflection loss of the second sample is T2, the thickness of the first sample is Td1 (mm), and the thickness of the second sample is Td2 (mm), where Td1<Td2, an internal transmittance t at a thickness Tdx (mm) can be calculated by the following Equation (1).

$$\tau = \exp\left[-Tdx \times (\ln T1 - \ln T2)/\Delta Td\right] \quad (1)$$

An external transmittance of infrared rays can be measured by, for example, a Fourier transform infrared spectrometer (product name: Nicolet iS10 manufactured by ThermoScientific).

The base material 22 has a refractive index of preferably 1.5 or more and 4.0 or less, more preferably 2.0 or more and 4.0 or less, and still more preferably 2.2 or more and 3.5 or less with respect to light having a wavelength of 10 μm. As the refractive index of the base material 22 falls within the numerical range, far-infrared rays can be appropriately transmitted, and for example, the performance of the far-infrared camera CA1 can be sufficiently exhibited. The refractive index can be determined by performing fitting of an optical model using, for example, polarization information obtained by an infrared spectroscopic ellipsometer (IR-VASE-UT manufactured by J.A. Woollam) and a spectral transmission spectrum obtained by a Fourier transform infrared spectrometer.

A thickness DO of the base material 22 is preferably 1.5 mm or more and 5 mm or less, more preferably 1.7 mm or more and 4 mm or less, and still more preferably 1.8 mm or more and 3 mm or less. As the thickness DO is within the range, far-infrared rays can be appropriately transmitted while ensuring strength.

A material of the base material 22 is not particularly limited, and examples thereof include Si, Ge, ZnS, and chalcogenide glass. It can be said that the base material 22 preferably contains at least one material selected from the group consisting of Si, Ge, ZnS, and chalcogenide glass. As such a material is used for the base material 22, far-infrared rays can be appropriately transmitted.

A preferable composition of the chalcogenide glass is a composition containing, in atom %,
7% to 25% of Ge+Ga,
0% to 35% of Sb,
0% to 20% of Bi,
0% to 20% of Zn,
0% to 20% of Sn,
0% to 20% of Si,
0% to 20% of La,
55% to 80% of S+Se+Te,
0.005% to 0.3% of Ti,
0% to 20% of Li+Na+K+Cs, and
0% to 20% of F+Cl+Br+I. The glass preferably has a glass transition point (Tg) of 140° C. to 550° C.

Si or ZnS is more preferably used as the material of the base material 22.

In addition, the far-infrared transmissive member 20 may be provided with the frame member 52 (not illustrated) at the outer peripheral edge, and may be attached to the opening portion 19 via the frame member 52.

(Colliding Object)

FIG. 5 is a schematic view illustrating an example of a state in which the vehicle glass is attached to the vehicle. The glass substrate 10 has a structure in which, even in a case where a colliding object collides with the glass substrate 10 from the outside of the vehicle, the impact is absorbed due to, for example, the presence of the intermediate layer 16, and the colliding object hardly penetrates through the glass substrate 10. On the other hand, as illustrated in FIG. 5, the far-infrared transmissive member 20 is provided in the opening portion 19 formed in the glass substrate 10, and is at a position not overlapping the glass substrate 10 when viewed from the Z direction. Therefore, for example, in a case where the colliding object collides with the far-infrared transmissive member 20 from the outside of the vehicle, there is a possibility that the colliding object penetrates through the far-infrared transmissive member 20 and reaches the driver's seat or the like in the vehicle. In the vehicle glass 1 according to the present embodiment, a protective member 40 is provided on the vehicle interior side of the far-infrared transmissive member 20, so that the colliding object can be held by the protective member 40 even when the colliding object penetrates through the far-infrared transmissive member 20, and the colliding object is prevented from reaching the driver's seat. Further, an occupant or an object on the vehicle interior side is suppressed from penetrating through a window portion and being thrown out of the vehicle at the time of vehicle collision. Hereinafter, a specific configuration of the vehicle glass 1 of the present embodiment will be described.

(Attachment Position of Vehicle Glass)

As illustrated in FIG. 5, the vehicle glass 1 is attached to the vehicle V in such a way as to be inclined with respect to a vertical direction. Therefore, when a vertically downward direction is a direction YV, the direction Y of the vehicle glass 1 in a state of being attached to the vehicle V is inclined with respect to the direction YV, and the vehicle exterior side surface 20*a* of the far-infrared transmissive member 20 is also inclined with respect to the direction YV. In addition, when a horizontal direction from a front side to a rear side of the vehicle V is a direction ZV, the direction Z of the vehicle glass 1 in a state of being attached to the vehicle V is inclined with respect to the direction ZV, and a perpendicular line AX orthogonal to the surface 20*a* of the far-infrared transmissive member 20 is also inclined with respect to the direction ZV. However, the vehicle glass 1 is not limited to being attached to the vehicle V in such a way as to be inclined with respect to the vertical direction, and for example, the direction Y of the vehicle glass 1 in a state of being attached to the vehicle V and the surface 20*a* of the far-infrared transmissive member 20 may be along the direction YV, and the direction Z and the perpendicular line AX of the vehicle glass 1 in a state of being attached to the vehicle V may be along the direction ZV. Hereinafter, unless otherwise specified, a state in which the vehicle glass 1 is attached to the vehicle V will be described.

(Attachment Position of Far-Infrared Camera)

The far-infrared camera CA1 is provided in the vehicle V. The far-infrared camera CA1 is provided on the vehicle interior side of the far-infrared transmissive member 20 of the vehicle glass 1, that is, on a direction ZV side (a direction Z side) of the far-infrared transmissive member 20. The far-infrared camera CA1 is provided in such a way that an optical axis AXR passes through the far-infrared transmissive member 20. Furthermore, the far-infrared camera CA is provided in such a way that a detection range R passes through the far-infrared transmissive member 20. The detection range R refers to a range (imaging range) that can be detected by the far-infrared camera CA1, and it can be said that the far-infrared camera CA receives and detects far-infrared rays incident through the detection range R. The detection range R can be said to be a space that expands around the optical axis AXR at a predetermined viewing angle as the distance from the far-infrared camera CA1 increases. The size and viewing angle of the detection range R may be appropriately set according to the distance and range desired to be detected by the far-infrared camera.

In the present embodiment, the optical axis AXR of the far-infrared camera CA1 is inclined with respect to the perpendicular line AX of the far-infrared transmissive member 20. That is, the optical axis AXR of the far-infrared camera CA1 is not along the surface 20*a* of the far-infrared transmissive member 20 and is not orthogonal to the surface 20*a* of the far-infrared transmissive member 20. For example, an angle formed by the optical axis AXR and the direction ZV may be smaller than an angle formed by the perpendicular line AX of the far-infrared transmissive member 20 and the direction ZV. However, a relationship between the optical axis AXR and the perpendicular line AX is not limited thereto. For example, the far-infrared camera CA1 may be provided in such a way that the optical axis AXR is along the perpendicular line AX of the far-infrared transmissive member 20.

(Configuration of Vehicle Glass)

As illustrated in FIG. 5, the vehicle glass 1 according to the present embodiment includes a cover portion 30 and the protective member 40 in addition to the glass substrate 10 and the far-infrared transmissive member 20 provided in the opening portion 19 of the glass substrate 10. The far-infrared camera CA1 may be treated as being included in the vehicle glass 1, or may be treated as a separate body from the vehicle glass 1. Furthermore, for example, the far-infrared camera CA1, the cover portion 30, and the protective member 40 may be included in a camera unit U attached to the vehicle glass 1 (glass substrate 10).

(Cover Portion)

The cover portion 30 is provided in the vehicle V and houses a housing 32 and a fixing portion 34. The cover portion 30 is provided on the vehicle interior side of the far-infrared transmissive member 20 of the vehicle glass 1, that is, on the direction ZV side (the direction Z side) of the far-infrared transmissive member 20. The housing 32 is preferably larger than the far-infrared transmissive member 20. The cover portion 30 includes the housing 32 and the fixing portion 34. The housing 32 houses the far-infrared camera CA1 and the protective member 40 therein. The far-infrared camera CA1 may be arranged in the housing 32 in a state of being fixed by a bracket (not illustrated). The housing 32 is attached to the glass substrate 10 in such a way that one surface side is opened and the opened side faces a vehicle interior side surface 10B of the glass substrate 10. The fixing portion 34 is a member that is provided in the housing 32 and fixes the housing 32 to the glass substrate 10. The fixing portion 34 fixes the housing 32 to the glass substrate 10 in a state where the opened side of the housing 32 faces the surface 10B of the glass substrate 10.

The cover portion 30 may be made of any material, but may be, for example, a resin member that does not transmit visible light. In addition, the cover portion 30 can thus suppress the far-infrared camera CAL and the like from being visually recognized by an occupant of the vehicle V and the like.

The cover portion 30 is not an essential component, and the far-infrared camera CA1 and the protective member 40 do not have to be housed in the cover portion 30.

Furthermore, the cover portion 30 may have an integrated structure in which not only the far-infrared camera CA1 but also the visible light camera CA2 and other devices are housed.

Furthermore, a heater or the like may be provided in the cover portion 30 in order to prevent fogging of the glass substrate 10 and the far-infrared transmissive member 20 on the vehicle interior side and to impart a snow melting function.

(Protective Member)

Figure 6:
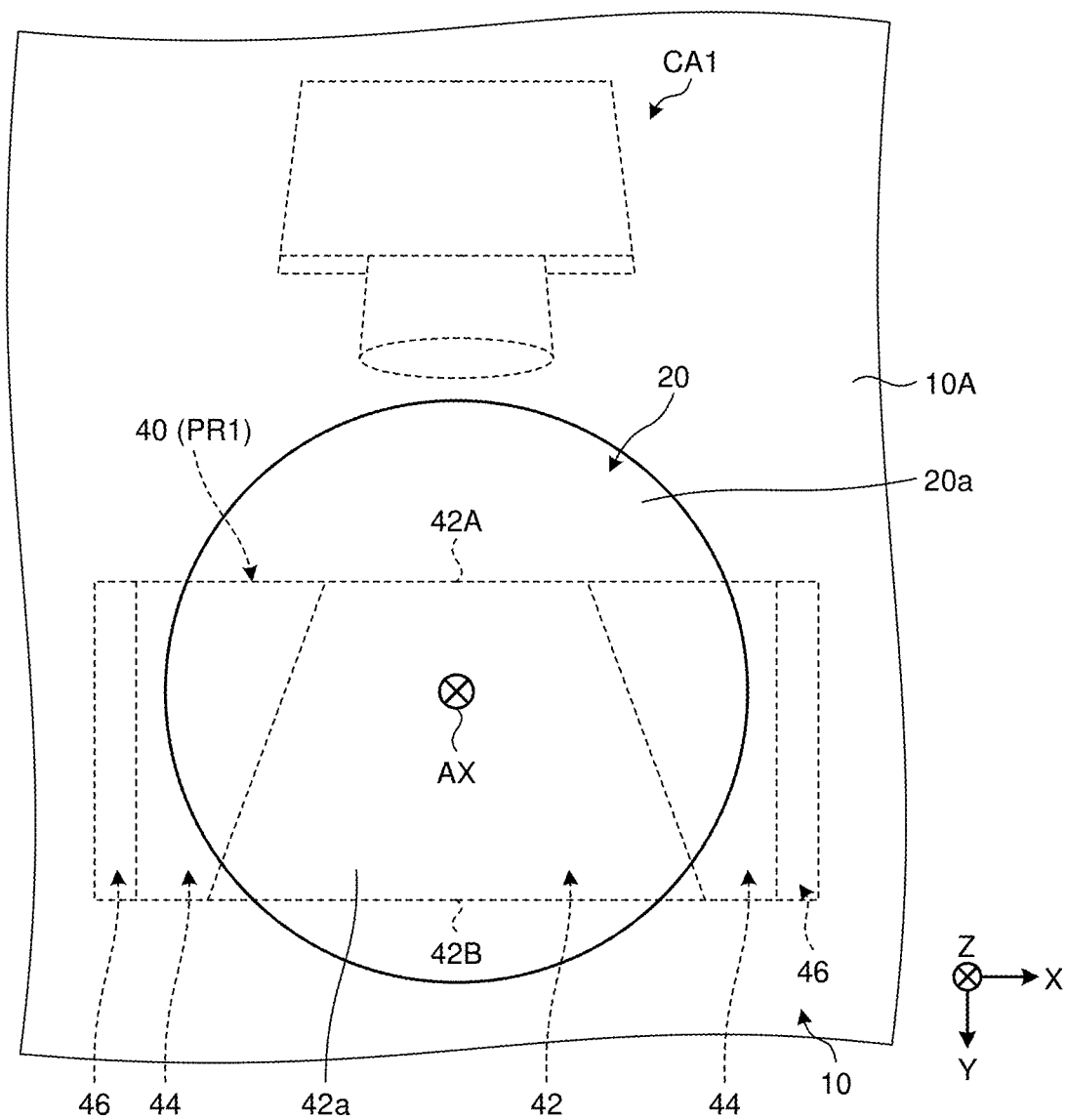
FIG. 6 is a schematic view of a far-infrared transmissive member as viewed from a perpendicular direction from outside the vehicle.

FIG. 6 is a schematic view of the far-infrared transmissive member as viewed from a perpendicular direction from the outside the vehicle. Hereinafter, the protective member 40 according to the present embodiment will be described with reference to FIGS. 5 and 6. As illustrated in FIG. 5, the protective member 40 is provided on the vehicle interior side (direction ZV side) of the far-infrared transmissive member 20. As illustrated in FIG. 6, the protective member 40 overlaps with at least a part of the far-infrared transmissive member 20 when viewed from a direction along the perpendicular line AX (a direction orthogonal to the surface 20a of the far-infrared transmissive member 20). In other words, at least a part of the protective member 40 and at least a part of the far-infrared transmissive member 20 overlap each other when viewed from the direction along the perpendicular line AX. As a result, even in a case where a colliding object from the outside of the vehicle penetrates through the far-infrared transmissive member 20, the colliding object is received by the protective member 40, and it is possible to suppress the colliding object from reaching the driver's seat. Further, an occupant or an object on the vehicle interior side can be suppressed from penetrating through a window portion and being thrown out of the vehicle at the time of vehicle collision. Furthermore, as illustrated in FIG. 5, in the present embodiment, the protective member 40 is preferably provided on the vehicle exterior side (a side opposite to the direction ZV) of the far-infrared camera CA1, and is preferably provided at a position not overlapping with the detection range R of the far-infrared camera CA1. That is, it is preferable that the protective member 40 does not interfere with the detection range R and is positioned outside the detection range R. As a result, far-infrared rays incident on the far-infrared camera CA1 are prevented from being blocked by the protective member 40, and a decrease in far-infrared ray detection accuracy can be suppressed.

More specifically, the protective member 40 includes a surface portion 42, a protruding portion 44, and a fixing portion 46. As illustrated in FIG. 6, the surface portion 42 is provided at a position overlapping with at least a part of the far-infrared transmissive member 20 when viewed from the direction along the perpendicular line AX. The surface portion 42 preferably overlaps with a region whose area is 30% or more of the entire region of the far-infrared transmissive member 20 when viewed from the direction along the perpendicular line AX. In other words, when a region overlapping with the surface portion 42 in the entire region of the far-infrared transmissive member 20 when viewed from the direction along the perpendicular line AX is defined as an overlapping region, the area of the overlapping region is preferably 30% or more of the area of the entire region of the far-infrared transmissive member 20. If the area of the overlapping region is 30% or more of the area of the entire region of the far-infrared transmissive member 20, collision energy can be sufficiently absorbed by the protective member even when the colliding object penetrates through the far-infrared transmissive member 20. In addition, the area of the overlapping region is more preferably 35% or more and still more preferably 40% or more of the area of the entire region of the far-infrared transmissive member 20. On the other hand, the area of the overlapping region is preferably 100% of the area of the entire region of the far-infrared transmissive member 20 as long as the protective member 40 does not interfere with the detection range R, the far-infrared camera CA1, and the housing 32 (that is, the surface portion 42 preferably overlaps with the entire region of the far-infrared transmissive member 20 when viewed from the direction along the perpendicular line AX). In addition, the area of the overlapping region may be less than 90% of the area of the entire region of the far-infrared transmissive member 20. If the area of the overlapping region is less than 90% of the area of the entire region of the far-infrared transmissive member 20, there is no possibility that the protective member 40 interferes with the detection range R. The area of the overlapping region is more preferably 85% or less and still more preferably 80% or less of the area of the entire region of the far-infrared transmissive member 20. As the area of the overlapping region is within the range, it is possible to suitably suppress a colliding object penetrating through the far-infrared transmissive member 20 from reaching the driver's seat. In addition, an occupant or an object on the vehicle interior side can be reliably suppressed from penetrating through a window portion and being thrown out of the vehicle at the time of vehicle collision.

As described above, the area of the overlapping region may be 100%, preferably 30% or more and 100% or less, 35% or more and less than 90%, 40% or more and 85% or less, and 40% or more and 80% or less of the area of the entire region of the far-infrared transmissive member 20.

The protective member 40 may be subjected to mesh processing or punching processing for the purpose of weight reduction, impact absorption, or the like. In other words, an opening 40PRa may be formed in the surface portion 42 of the protective member 40.

In a case where the opening 40PRa is formed in the surface portion 42 of the protective member 40, the area of the opening 40PRa is also included in the area of the overlapping region of the protective member 40. In other words, in the entire region of the far-infrared transmissive member 20, a region obtained by combining a region overlapping with a portion of the surface portion 42 where the opening 40PRa is not formed and a region overlapping with a portion of the surface portion 42 where the opening 40PRa is formed (in other words, a region overlapping with a region surrounded by the peripheral edge of the protective member 40 in the entire region of the far-infrared transmissive member 20) is set as the overlapping region. In a case where the opening 40PRa is formed in the surface portion 42 of the protective member 40, the area of each opening 40PRa is preferably 010 mm or less in terms of diameter. If the area of the opening 40PRa is 010 mm or less, there is no possibility that the function as the protective member is impaired even when a flying stone or the like collides with the far-infrared transmissive member 20. The area of the opening 40PRa is preferably 08 mm or less, and more preferably 05 mm or less. For example, the area of $10 mm or less in terms of diameter means that the area is equal to or less than the area of a circle having a diameter of 10 mm.

Figure 12:
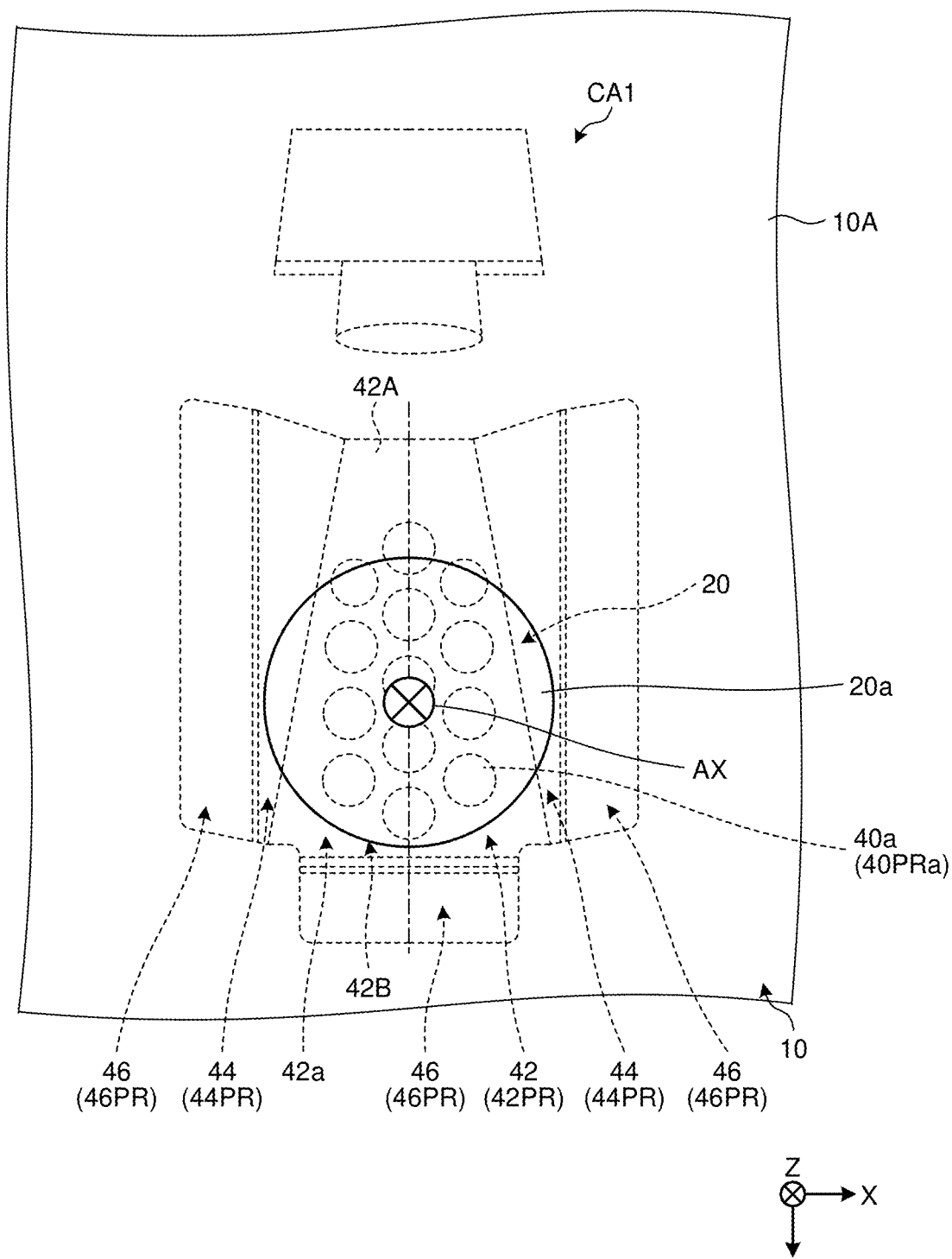
FIG. 12 is a schematic view of a window member of Example 6 as viewed from a direction along a perpendicular line AX.

As illustrated in FIGS. 5 and 6 and FIG. 12 to be described below, the surface portion 42 is provided at a position not overlapping with the detection range R of the far-infrared camera CA1. In the example of the present embodiment, the surface portion 42 is positioned on a direction YV side (a lower side in the vertical direction) of the detection range R. In other words, it can be said that the surface portion 42 is positioned below the far-infrared camera CA1 in the vertical direction. That is, in the present embodiment, it can be said that the surface portion 42 is positioned on the direction YV side (the lower side in the vertical direction) and the vehicle exterior side (a side opposite to the direction ZV) of the far-infrared camera CA1.

As illustrated in FIGS. 5, 6, and 12, the surface portion 42 is a plate-like member, and extends from an end portion 42B to an end portion 42A. The surface portion 42 has a planar shape in the present embodiment. The end portion 42B is an end portion of the surface portion 42 on the direction ZV side (vehicle exterior side), and the end portion 42A is an end portion of the surface portion 42 on a side (vehicle interior side) opposite to the direction ZV. In addition, it can be said that the end portion 42B is an end portion of the surface portion 42 on a side far from the far-infrared camera CA1, and the end portion 42A is an end portion of the surface portion 42 on a side close to the far-infrared camera CA1. However, the shape of the surface portion 42 may be arbitrary, for example, may be a curved surface shape and does not have to be a plate-like shape.

A surface 42a of the surface portion 42 that faces the far-infrared transmissive member 20 is inclined with respect to the direction YV (horizontal direction). The surface portion 42 is inclined with respect to the direction YV in such a way that the surface 42a is directed toward a side opposite to the direction YV, that is, toward a vertically upper side, from the end portion 42B toward the end portion 42A. The surface 42a of the surface portion 42 is also inclined with respect to the direction ZV (vertical direction). It can be said that the surface portion 42 is inclined with respect to the direction ZV in such a way that the surface 42a is directed toward the direction YV side, that is, toward the far-infrared camera CA1 from the end portion 42B on a vertically lower side toward the end portion 42A on a vertically upper side. That is, the surface portion 42 is inclined with respect to the direction YV and the direction ZV in such a way as to be directed toward the direction ZV side while being directed toward the side opposite to the direction YV from the end portion 42B toward the end portion 42A. More specifically, the surface portion 42 is provided to be inclined with respect to the far-infrared transmissive member 20 in such a way that a distance between the surface 42a and the far-infrared transmissive member 20 increases from the end portion 42B toward the end portion 42A, that is, toward the far-infrared camera CA1. For example, an angle formed by the horizontal direction (the direction ZV) and a straight line along the surface 42a of the surface portion 42 that faces the far-infrared transmissive member 20 is smaller than an angle formed by the horizontal direction (the direction ZV) and a straight line along the surface 20a of the far-infrared transmissive member 20. As the surface portion 42 is inclined in this manner, it is possible to increase the area overlapping with the far-infrared transmissive member 20 and prevent overlapping with the detection range R of the far-infrared camera CA1. However, the direction of the surface portion 42 is not limited to the above description and may be any direction.

Further, as illustrated in FIGS. 6 and 12, a width of the surface portion 42, which is a length in the X direction, decreases from the end portion 42B toward the end portion 42A, that is, toward the far-infrared camera CA1. Since the width of the surface portion 42 decreases as the distance to the far-infrared camera CA1 decreases, it is possible to increase the area overlapping with the far-infrared transmissive member 20 and prevent overlapping with the detection range R of the far-infrared camera CA1. However, the width of the surface portion 42 is not limited thereto.

Figure 9:
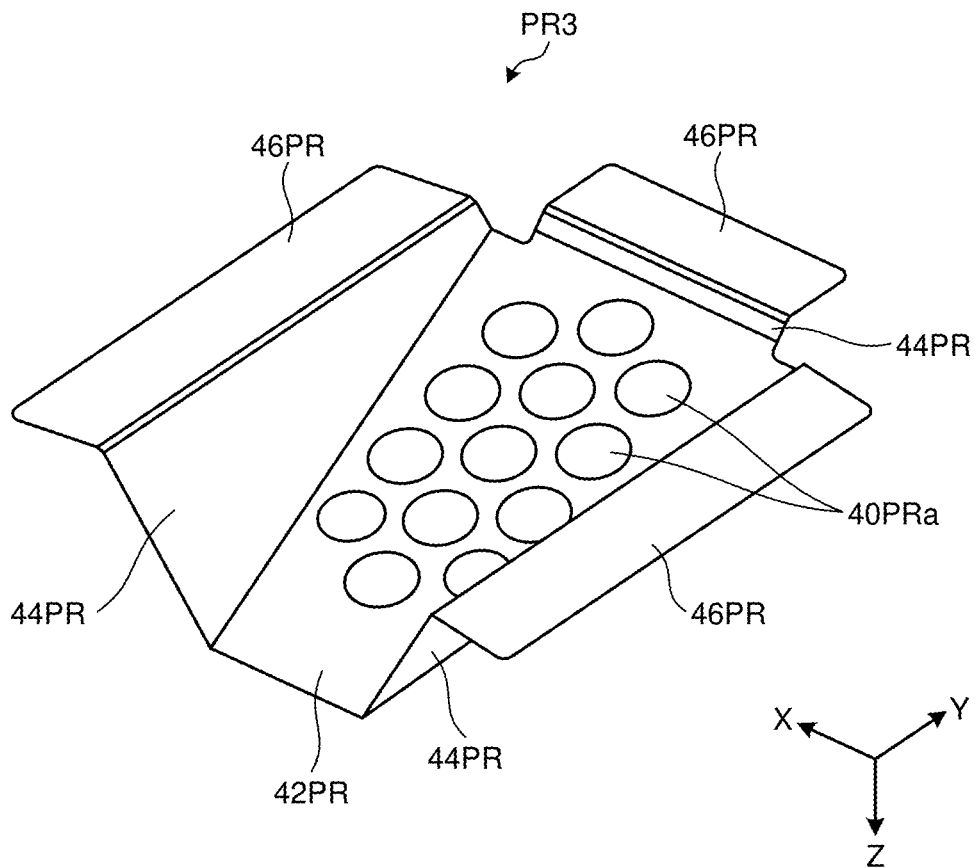
FIG. 9 is a schematic view illustrating one aspect of the protective member.

As illustrated in FIG. 5, the protruding portion 44 protrudes from opposite ends of the surface portion 42 in the X direction toward the glass substrate 10 (vehicle exterior side). As illustrated in FIGS. 6 and 12, the protruding portion 44 is formed in such a way as to spread outward, that is, in such a way as to be away from the surface portion 42 in the X direction, as the distance to a distal end on the glass substrate 10 side decreases. The fixing portion 46 is formed at the distal end of the protruding portion 44 on the glass substrate 10 side. The fixing portion 46 is fixed to the vehicle interior side surface 10B of the glass substrate 10. That is, the protective member 40 is fixed to the glass substrate 10 via the fixing portion 46. The protruding portion 44 and the fixing portion 46 are also provided at positions not overlapping with the detection range R of the far-infrared camera CA1. However, the shapes of the protruding portion 44 and the fixing portion 46 are not limited thereto, and may be any shapes. In addition, for example, as illustrated in FIG. 9 to be described below, the fixing portion 46 for the vehicle interior side surface 10B of the glass substrate 10 is also provided in a direction away from the far-infrared camera CA1, whereby the fixing between the glass surface 10B and the protective member 40 can be further strengthened. That is, the fixing portion 46 (a fixing portion 46PR in the example of FIG. 9) may be provided on a side farther from the far-infrared camera CA1 (a direction Y side in the example of FIG. 9) with respect to the surface portion 42 (a surface portion 42PR in the example of FIG. 9). In this case, it is preferable to provide three fixing portions 46 at opposite side portions with respect to the surface portion 42 (an X direction side and a side opposite to the X direction in the example of FIG. 9) and a side farther from the far-infrared camera CA1 with respect to the surface portion 42 (the Y direction side in the example of FIG. 9).

The glass surface 10B and the protective member 40 are preferably fixed via an adhesive layer 53. At this time, a material of the adhesive layer 53 is arbitrary, but it is preferable that the adhesive layer is formed of a cured product of a commercially available adhesive tape and/or a liquid curable adhesive from the viewpoint of viscoelasticity of the adhesive layer 53. Examples of the material of the curable adhesive include a urethane-based adhesive and a silicone-based adhesive. In particular, it is preferable that the adhesive layer 53 contains a cured product of a modified silicone-based adhesive because the protective member 40 and the glass surface 10B can be firmly fixed even under a low temperature condition where an adhesive force of the adhesive layer is reduced and the adhesive layer is easily peeled off.

The protective member 40 may be made of any material, but is preferably made of a material having a higher breaking strength than the far-infrared transmissive member 20. In addition, the protective member 40 is preferably made of a material having a higher breaking strength than the cover portion 30. Examples of the material of the protective member 40 include stainless steel, an aluminum alloy, a copper alloy, a rolled steel plate, and a fiber-reinforced resin. Examples of the fiber-reinforced resin include glass-reinforced polycarbonate. The breaking strength may be, for example, a value obtained by dividing a load when a test piece is broken in a tensile strength test performed according to JIS Z2241 by the minimum cross-sectional area of the broken portion.

In a case where the protective member 40 is made of metal, for example, it is preferable that the surface thereof is subjected to non-glossy processing. That is, it is preferable that the protective member 40 has a non-glossy layer formed on the surface thereof. For the non-gloss layer, for example, blasting and plating are performed. In this case, an arithmetic average roughness Ra of the protective member 40 defined in JIS B 0601:2001 is preferably 0.1 μm or more, and more preferably 0.2 μm or more. In addition, for example, in a case of using the rolled steel plate, it is preferable to apply cationic coating in order to improve adhesion with the adhesive layer 53.

Figure 7:
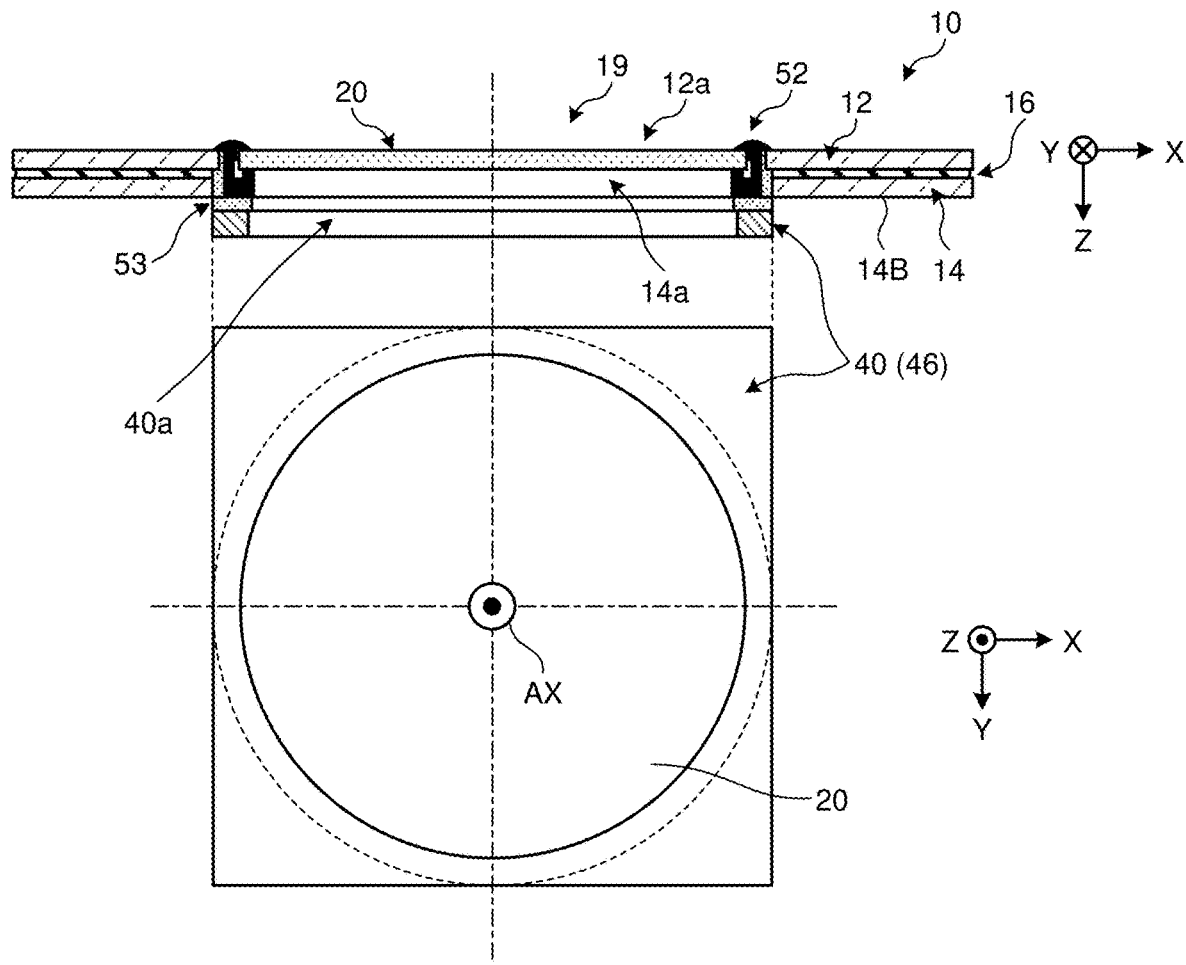
FIG. 7 is a schematic view in a case where a size of an opening of an inner plate glass is larger than a size of an opening of an outer plate glass, and (a part of) a protective member adheres to an inner side of the far-infrared transmissive member.

FIG. 7 illustrates another aspect of the protective member 40. FIG. 7 is a schematic view in a case where a size of an opening of an inner plate glass is larger than a size of an opening of an outer plate glass, and a protective member (which is a part of the protective member 40 and corresponds to the fixing portion 46) adheres to the inner side of the far-infrared transmissive member 20. In addition, as illustrated in FIG. 7, the protective member 40 may have an opening 40a that is smaller than the area of the opening portion 14a of the glass substrate 14 and has a shape that does not block a portion through which far-infrared rays are transmitted, and may have a structure in which a bonding strength is increased so that the far-infrared transmissive member 20 and the frame member 52 are not detached when pushed from the outside. More specifically, the opening 40a which penetrates in the Z direction and is smaller than the area of the opening portion 14a when viewed from the Z direction is formed in the protective member 40. The protective member 40 is attached to a Z direction side of the glass substrate 10 (here, a Z direction side of the glass substrate 14) in such a way that the opening 40a overlaps with the opening portion 19 of the glass substrate 10 (here, the opening portion 12a of the glass substrate 12 and the opening portion 14a of the glass substrate 14) when viewed from the Z direction. Furthermore, in this configuration, the far-infrared transmissive member 20 is preferably provided with the frame member 52 at the outer peripheral edge and attached to the opening portion 19 (the opening portion 12a of the glass substrate 12 in the example of FIG. 7) via the frame member 52. An inner peripheral surface of the frame member 52 is fixed to an outer peripheral surface of the far-infrared transmissive member 20, and an outer peripheral surface thereof is fixed to an outer peripheral surface of the opening portion 19 (the opening portion 12a in the example of FIG. 7). A surface of the protective member 40 on a side opposite to the Z direction of the protective member 40 is fixed to an end surface of the frame member 52 on the Z direction side via the adhesive layer 53. The opening 40a is at a position that does not block a portion through which far-infrared rays are transmitted in a state where the protective member 40 is attached to the glass substrate 10. For example, as the inner peripheral surface of the opening 40a is positioned radially outward of at least one of the inner peripheral surface of the frame member 52 or an inner peripheral surface of the adhesive layer 53 with the perpendicular line AX as the central axis, and the area is larger than those of an opening of the frame member 52 and an opening of the adhesive layer 53, it is possible not to block a portion through which far-infrared rays pass. The size of the opening 40a is not limited thereto.

Further, the protective member 40 illustrated in FIGS. 5, 6, and 12 and the protective member 40 illustrated in FIG. 7 may be used in combination.

The frame member 52 is not limited to be mounted only in a case where the protective member 40 in which the opening portion 40a is formed as illustrated in FIG. 7 is provided, and may be mounted in a case where the protective member 40 having an arbitrary shape is provided.

(Effects)

As described above, the vehicle glass 1 according to the present embodiment includes the light shielding region A2, and the far-infrared transmitting region B in which the opening portion 19 and the far-infrared transmissive member 20 arranged in the opening portion 19 are provided is formed in the light shielding region A2. The vehicle glass 1 further includes the protective member 40 that is provided on the vehicle interior side of the far-infrared transmissive member 20 and overlaps with at least a part of the far-infrared transmissive member 20 when viewed from a direction (the direction along the perpendicular line AX) orthogonal to the vehicle exterior side surface 20a of the far-infrared transmissive member 20. In the vehicle glass 1 in which the far-infrared transmissive member 20 is provided in the opening portion 19, in a case where a colliding object collides with the far-infrared transmissive member 20 from the outside of the vehicle, there is a possibility that the colliding object penetrates through the far-infrared transmissive member 20 and reaches the driver's seat. On the other hand, in the present embodiment, as the protective member 40 overlapping with at least a part of the far-infrared transmissive member 20 is provided, even when the colliding object penetrates through the far-infrared transmissive member 20, the colliding object is received by the protective member 40, and the colliding object can be suppressed from reaching the driver's seat. In addition, an occupant or an object on the vehicle interior side can be suppressed from penetrating through a window portion and being thrown out of the vehicle at the time of vehicle collision.

Further, the protective member 40 preferably overlaps with a region whose area is 30% or more of the entire region of the far-infrared transmissive member 20 when viewed from the direction orthogonal to the vehicle exterior side surface 20a of the far-infrared transmissive member 20. As the protective member 40 overlaps with the far-infrared transmissive member 20 within the range, it is possible to appropriately receive the colliding object and suppress the colliding object from reaching the driver's seat. In addition, an occupant or an object on the vehicle interior side can be suppressed from penetrating through a window portion and being thrown out of the vehicle at the time of vehicle collision.

It is preferable that the far-infrared camera CA1 is mounted on the vehicle interior side of the far-infrared transmissive member 20, and the protective member 40 is provided on the vehicle exterior side of the far-infrared camera CA1 at a position not overlapping with the detection range R of the far-infrared camera CA1. In the vehicle glass 1 according to the present embodiment, the protective member 40 prevents the colliding object from reaching the driver's seat, and the protective member 40 is provided at a position not overlapping with the detection range R, so that far-infrared rays incident on the far-infrared camera CA1 can be prevented from being blocked by the protective member 40, and degradation of far-infrared ray detection accuracy can be suppressed.

It is preferable that the protective member 40 includes the surface portion 42 overlapping with the far-infrared transmissive member 20, the protruding portion 44, and the fixing portion 46, and is fixed to the vehicle interior side surface of the glass substrate 10 via the fixing portion 46, and the surface portion 42 is provided to be inclined with respect to the far-infrared transmissive member 20 in such a way as to be away from the far-infrared transmissive member 20 as the distance to the far-infrared camera CA1 decreases. As the surface portion 42 of the protective member 40 is inclined in this manner, it is possible to increase the area overlapping with the far-infrared transmissive member 20 and prevent overlapping with the detection range R of the far-infrared camera CA1.

In addition, in the protective member 40, it is preferable that the width of the surface portion 42 overlapping with the far-infrared transmissive member 20 decreases as the distance to the far-infrared camera CA1 decreases. This makes it possible to increase the area of the protective member 40 overlapping with the far-infrared transmissive member 20 and to prevent overlapping with the detection range R of the far-infrared camera CA1.

In addition, it is preferable that the vehicle glass 1 further includes the cover portion 30 that is provided on the vehicle interior side of the far-infrared transmissive member 20 and houses the protective member 40 and the far-infrared camera CA1. As the cover portion 30 is provided, the protective member 40 and the far-infrared camera CA1 can be appropriately housed.

It is preferable that the protective member 40 is made of a material having a higher breaking strength than the far-infrared transmissive member 20. As a result, the protective member 40 can appropriately prevent a colliding object from reaching the driver's seat. In addition, an occupant or an object on the vehicle interior side can be suppressed from penetrating through a window portion and being thrown out of the vehicle at the time of vehicle collision.

It is preferable that the material of the protective member 40 is one selected from stainless steel, an aluminum alloy, a copper alloy, a rolled steel plate, and a fiber-reinforced resin. As a result, the protective member 40 can appropriately prevent a colliding object from reaching the driver's seat. In addition, an occupant or an object on the vehicle interior side can be suppressed from penetrating through a window portion and being thrown out of the vehicle at the time of vehicle collision.

The adhesion between the adhesive layer 53 and the protective member 40 can be improved by performing blasting before applying an adhesive to the fixing portion 46 that is an adhesion surface for the glass substrate 10. As a result, it is possible to suppress detachment of the protective member 40 from the glass substrate 10 at the time of collision.

Further, it is preferable that the far-infrared transmissive member 20 includes the base material 22 made of at least one material selected from the group consisting of Si, Ge, ZnS, and chalcogenide glass. As such a material is used for the base material 22, the vehicle glass 1 can appropriately transmit far-infrared rays.

(Another Example of Far-Infrared Transmissive Member)

The far-infrared transmissive member 20 may include a layer other than the base material 22. For example, the far-infrared transmissive member 20 may include an anti-reflection film (AR film) that suppresses reflection of far-infrared rays on at least one of the vehicle interior side surface or the vehicle exterior side surface of the base material 22. The antireflection film may have any configuration, but for example, may have a configuration in which a high refractive index layer and a low refractive index layer are alternately laminated. In this case, in the antireflection film, the high refractive index layer and the low refractive index layer may be laminated one by one, or a plurality of high refractive index layers and a plurality of low refractive index layers may be laminated.

The high refractive index layer is a film having a high refractive index with respect to far-infrared rays, and has a refractive index of preferably 2.5 or more and 4.5 or less, more preferably 3.0 or more and 4.5 or less, and still more preferably 3.3 or more and 4.3 or less with respect to light having a wavelength of 10 μm. A material of the high refractive index layer may be any material, and examples thereof include those containing at least one material selected from the group consisting of Si and Ge as a main component, diamond-like carbon (DLC), ZnSe, $As_2S_3$, and $As_2Se_3$.

The low refractive index layer is a film having a low refractive index with respect to far-infrared rays, and has a refractive index of preferably 0.8 or more and 2.0 or less, more preferably 1.0 or more and 1.7 or less, and still more preferably 1.0 or more and 1.5 or less with respect to light having a wavelength of 10 μm. A material of the low refractive index layer may be any material, and examples thereof include ZnS, a metal oxide (for example, $SiO_x$, $Al_2O_3$, $NiO_x$, $CuO_x$, Zno, $ZrO_2$, $Bi_2O_3$, $Y_2O_3$, $CeO_2$, $HfO_2$, MgO, $TiO_x$, or the like), and a metal fluoride (for example, $MgF_2$, $CaF_2$, $SrF_2$, $BaF_2$, $PbF_2$, $LaF_3$, $YF_3$, or the like).

Furthermore, for example, in the far-infrared transmissive member 20, a visible light absorbing layer may be formed on at least one of the vehicle interior side surface or the vehicle exterior side surface of the base material 22. The visible light absorbing layer is a layer that absorbs visible light. The visible light absorbing layer has an extinction coefficient of preferably 0.04 or more, more preferably 0.05 or more, still more preferably 0.06 or more, still more preferably 0.07 or more, still more preferably 0.08 or more, and still more preferably 0.10 or more with respect to light having a wavelength of 550 nm. In addition, the visible light absorbing layer has an average extinction coefficient of preferably 0.04 or more, more preferably 0.05 or more, still more preferably 0.06 or more, still more preferably 0.07 or more, still more preferably 0.08 or more, and still more preferably 0.10 or more with respect to light having a wavelength of 380 nm to 780 nm. As the extinction coefficient and the average extinction coefficient fall within the ranges, it is possible to appropriately suppress reflectance dispersion of visible light and obtain an appearance securing designability.

The visible light absorbing layer can transmit far-infrared rays. The visible light absorbing layer has an extinction coefficient of preferably 0.1 or less, more preferably 0.05 or less, and still more preferably 0.02 or less with respect to light having a wavelength of 10 μm.

A material of the visible light absorbing layer is arbitrary, but it is preferable that the visible light absorbing layer contains a metal oxide as a main component. Here, the main component may indicate that a content with respect to the whole visible light absorbing layer is 50 mass % or more. It is preferable that the metal oxide used in the visible light absorbing layer is at least one of nickel oxide ($NiO_x$), copper oxide ($CuO_x$), or manganese oxide ($MnO_x$). It is preferable that the visible light absorbing layer contains at least one material selected from the group consisting of $NiO_x$, $CuO_x$, and $MnO_x$ as the main component. It can be said that the visible light absorbing layer preferably contains $NiO_x$ as the main component or contains at least one material selected from the group consisting of $CuO_x$ and $MnO_x$ as the main component. It is known that nickel oxide, copper oxide, and manganese oxide have a plurality of compositions according to the valences of nickel, copper, and manganese, and x can be any value from 0.5 to 2. The valence does not have to be a single valence, and two or more valences may be mixed. In the present embodiment, NiO is preferably used as $NiO_x$, CuO is preferably used as $CuO_x$, and MnO is preferably used as $MnO_x$. However, the material of the visible light absorbing layer is not limited thereto and may be any material such as diamond-like carbon (DLC).

Furthermore, for example, a protective film may be formed on the vehicle exterior side surface of the far-infrared transmissive member 20. It is preferable that the protective film contains, for example, at least one material selected from the group consisting of $ZrO_2$, $Al_2O_3$, $TiO_2$, $Si_3N_4$, AlN, and diamond-like carbon (DLC). As the protective film is formed, the far-infrared transmissive member 20 can be appropriately protected.

(Vehicle Glass Manufacturing Example)

Figure 8:
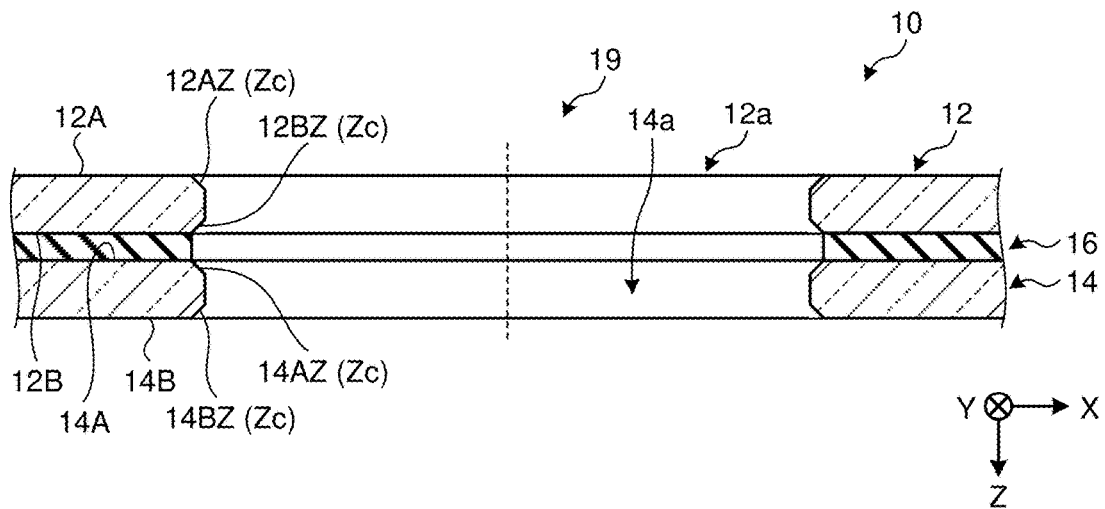
FIG. 8 is a schematic view illustrating an example of a shape of an inner surface of an opening portion.

FIG. 8 is a schematic view illustrating an example of a shape of an inner surface of the opening portion. As described above, in manufacturing the vehicle glass of the present invention, it is important to suppress the center position misalignment of the opening portion 12a of the glass substrate 12 and the opening portion 14a of the glass substrate 14. From the viewpoint of suppressing the center position misalignment, it is preferable to simultaneously process the opening portion 12a of the glass substrate 12 and the opening portion 14a of the glass substrate 14 of the laminated glass laminated in advance. On the other hand, from the viewpoint of the strength of the opening portion 19, in order to increase the strength of the inner surface of the opening portion 19 against a bending stress, it is preferable to process the inner surface of the opening portion 19 to be smooth, and further chamfer a boundary portion between the opening portion 19 and the glass substrate 12 to provide a chamfered portion Zc as illustrated in FIG. 8.

Here, when the opening portion 12a of the glass substrate 12 and the opening portion 14a of the glass substrate 14, which are laminated in advance, are simultaneously processed, the inner surface of the opening portion 19 can be processed to be smooth, chamfering finish of a boundary portion 12AZ between the opening portion 19 and the vehicle exterior side surface 12A of the glass substrate 12, and chamfering finish of a boundary portion 14BZ between the opening portion 19 and the vehicle interior side surface 14B of the glass substrate 14 can be performed. However, it is difficult to perform the chamfering finish of a boundary portion 12BZ between the opening portion 19 and the vehicle interior side surface 12B of the glass substrate 12 and a boundary portion 14AZ between the opening portion 19 and the vehicle exterior side surface 14A of the glass substrate 14. Therefore, in this manufacturing example, after the boundary portion 12AZ between the opening portion 12a of the glass substrate 12 and the vehicle exterior side surface 12A, the boundary portion 12BZ between the opening portion 12a of the glass substrate 12 and the vehicle interior side surface 12B, the boundary portion 14AZ between the opening portion 14a of the glass substrate 14 and the vehicle exterior side surface 14A, and the boundary portion 14BZ between the opening portion 14a of the glass substrate 14 and the vehicle interior side surface 14B are chamfered to provide the chamfered portions Zc at these boundary portions, the glass substrate 12 and the glass substrate 14 are laminated with the intermediate layer 16 interposed therebetween. According to this manufacturing example, it is possible to further suppress remaining of cracks in the boundary portion 12BZ and the boundary portion 14AZ generated at the time of forming the opening portion 19 as compared with a case where the opening portion 12a of the glass substrate 12 and the opening portion 14a of the glass substrate 14 of a laminated glass laminated in advance are simultaneously processed. Furthermore, it is also possible to prevent breakage of glass due to extension of a crack caused by a stress generated at an end portion of the opening portion 19 due to pressing of the glass substrate 10 from the outside. As described above, in the present embodiment, it is preferable that each of the boundary portions 12AZ, 12BZ, 14AZ, and 14BZ has a chamfered shape (that is, the chamfered portions Zc). An angle (chamfered angle) of a surface of the chamfered portion Zc with respect to the perpendicular line AX may be arbitrary, but may be, for example, 45°. Further, a depth (chamfering depth) of the chamfered portion Zc in the Z direction may be arbitrary, but may be, for example, about 0.5 mm. An arithmetic average roughness Ra of the inner surface of the opening portion 19 defined in JIS B 0601:2001 may be arbitrary, but may be, for example, about 1 μm or more and 10 μm or less.

Here, in a case where the glass substrate 12 and the glass substrate 14 are laminated after being chamfered, there is a possibility that the center positions of the opening portion 12a of the glass substrate 12 and the opening portion 14a of the glass substrate 14 are misaligned from each other. In a case where the center position of the opening portion 12a of the glass substrate 12 and the center position of the opening portion 14a of the glass substrate 14 are misaligned, it is necessary that the frame member 52 has a large outer peripheral width, which may impair the appearance. In addition, there is a possibility that the opening area of the opening portion 19 necessary for transmission of far-infrared rays cannot be secured.

Even in a case where the misalignment occurs between the center position of the opening portion 12a of the glass substrate 12 and the center position of the opening portion 14a of the glass substrate 14, for example, as illustrated in FIG. 7, the position of the frame member 52 when the frame member 52 is installed on the outer peripheral edge of the far-infrared transmissive member 20 is defined only by a hole diameter of the opening portion 12a of the glass substrate 12 and the position of the opening portion, so that the outer peripheral width of the frame member 52 can be reduced and the opening area of the opening portion 19 necessary for transmission of far-infrared rays can be secured. Alternatively, by increasing the hole diameter of the opening portion 14a of the glass substrate 14 to be larger than the hole diameter of the opening portion 12a of the glass substrate 12, the outer peripheral width of the frame member 52 can be reduced, and the opening area of the opening portion 19 necessary for transmission of far-infrared rays can be secured.

On the other hand, in a case where the hole diameter of the opening portion 14a of the glass substrate 14 is larger than the hole diameter of the opening portion 12a of the glass substrate 12, when the frame member 52 is fitted from the vehicle exterior side surface 12A side of the first glass substrate before fitting the far-infrared transmissive member 20, even if the frame member 52 is to be fixed to the opening portion 19 with an adhesive, the far-infrared transmissive member 20 and the frame member 52 are not supported by the glass substrate 14, and thus, when a load is applied from the vehicle exterior side toward the vehicle interior side, it is difficult to maintain the fixed state against the shear stress. That is, when the far-infrared transmissive member 20 is pushed from the vehicle exterior side toward the vehicle interior side by a finger or the like, the far-infrared transmissive member 20 may come off toward the vehicle interior inside. In order to solve this problem, as illustrated in FIG. 7, it is preferable to install the protective member 40 having an opening that is smaller than the area of the opening portion 14a and has a shape that does not block a portion through which far-infrared rays are transmitted on the vehicle interior side surface 14B side of the opening portion 14a of the glass substrate 14. At this time, it is preferable that the protective member 40 adheres to the glass substrate 14 via the adhesive layer 53.

The protective member 40 having the opening that is smaller than the area of the opening portion 14a and has a shape that does not block a portion through which far-infrared rays are transmitted has a structure in which the far-infrared transmissive member 20 and the frame member 52 support the far-infrared transmissive member 20 and the frame member 52 against the shear stress toward the inner side of the vehicle side glass, so that the far-infrared transmissive member 20 and the frame member 52 have a high mechanical durability. Furthermore, the viscoelasticity of the adhesive layer 53 itself and the elastic properties of the protective member 40 itself additionally enhance the effect of energy absorption and stress relaxation by plastic deformation. As a result, the far-infrared transmissive member 20 and the frame member 52 have excellent mechanical durability over a long period of time as compared with a case where the far-infrared transmissive member 20 and the frame member 52 are supported only by the glass substrate 14 which is a brittle material.

As described above, it is preferable that the manufacturing method according to the present embodiment includes:
  boring the opening portion 19 that penetrates through each of the glass substrate 12 and the glass substrate 14 in the thickness direction;
  chamfering the boundary portion 12AZ between the opening portion 12a and a vehicle exterior side surface of the glass substrate 12, the boundary portion 12BZ between the opening portion 12a and a vehicle interior side surface of the glass substrate 12, the boundary portion 14AZ between the opening portion 14a and a vehicle exterior side surface of the glass substrate 14, and the boundary portion 14BZ between the opening portion 14a and a vehicle interior side surface of the glass substrate 14;
  positioning the opening portion 12a of the glass substrate 12 and the opening portion 14a of the glass substrate 14, and then bonding the glass substrate 12 and the glass substrate 14 with the intermediate layer interposed therebetween to obtain a laminated glass;
  installing the far-infrared transmissive member 20 in the opening portion 19; and
  installing the protective member 40 overlapping with at least a part of the far-infrared transmissive member 20 when viewed from a direction orthogonal to the vehicle exterior side surface of the far-infrared transmissive member 20 on the vehicle interior side of the far-infrared transmissive member 20.

It is preferable that the glass surface 10B and the protective member 40 are fixed by placing a commercially available double-sided adhesive tape on the fixing portion 46 of the protective member 40 and/or placing the glass surface 10B side of the glass substrate 10 on a surface to which a liquid curable adhesive is applied, and drying. At this time, the material of the curable adhesive is arbitrary, but a urethane-based adhesive or a silicone-based adhesive is preferable from the viewpoint of the viscoelasticity of the cured product, that is, the adhesive layer 53. In particular, when the curable adhesive is a modified silicone-based adhesive, the protective member 40 and the glass surface 10B can be firmly fixed even under a low temperature condition where the adhesive force of the adhesive layer is reduced and the adhesive layer is easily peeled off, which is preferable.

At this time, if a primer is applied to at least one of the fixing portion 46 side of the protective member 40 or the glass surface 10B side before the adhesive is applied, the protective member 40 and the glass surface 10B can be more firmly fixed, which is preferable.

EXAMPLES

Next, examples will be described.
<Manufacturing of Far-Infrared Transmissive Member>
First, Si (FZ grade (manufactured by the FZ method)) having a diameter of 50 mm and a thickness of 2.0±0.05 mm was prepared as a base material. The thickness was measured with a digital caliper (CD-15 CX manufactured by Mitutoyo Corporation).

Next, a film of diamond-like carbon (DLC) having a thickness of 1000 nm was formed on a vehicle exterior side surface of the base material by plasma CVD. Thereafter, a Ge film (100 nm) and then a ZnS film (1200 nm) were formed on a vehicle interior side surface of the base material by vapor deposition to obtain a far-infrared transmissive member.

Figure 10:
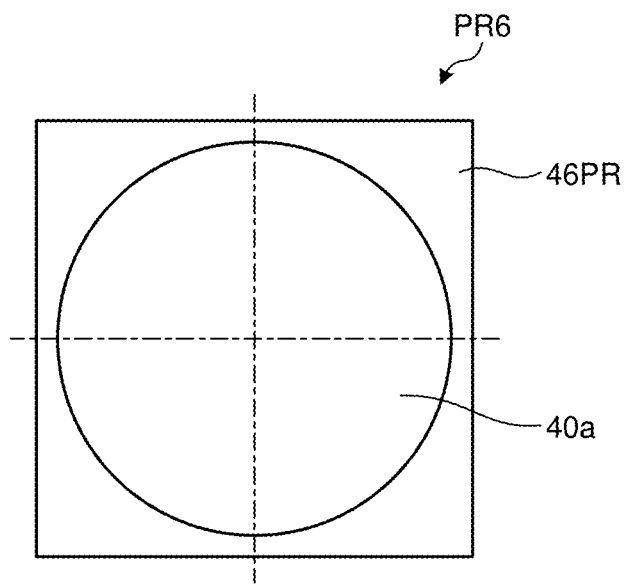
FIG. 10 is a schematic view illustrating one aspect of the protective member.

<Manufacturing of Bracket, Protective Member, and Cover>
A base bracket for bonding to a glass plate to be described below, attaching a far-infrared camera, and fixing a cover was produced by 3D printing using nylon 12 as a material. FIGS. 9 to 11 are schematic views illustrating one aspect of the protective member.

Protective members PR1 to PR6 were prepared. The protective member PR1 was produced by preparing a plate material (surface portion 42) having a size of 95×42 mm and a plate thickness of 0.8 mm and made of stainless steel (SUS304) and bending the plate material as illustrated in FIG. 6. As illustrated in FIG. 6, the protective member PR1 includes the surface portion 42 and two fixing portions 46. The surface portion 42 is a trapezoidal plate-like member. The fixing portion 46 is a plate-like member provided at the distal end of the protruding portion 44 protruding from the peripheral edge of the surface portion 42 toward the side opposite to the Z direction. One fixing portion 46 is provided at the distal end of the protruding portion 44 protruding from the peripheral edge of the surface portion 42 on the X direction side, and the other fixing portion 46 is provided at the distal end of the protruding portion 44 protruding from the peripheral edge of the surface portion 42 on a side opposite to the X direction.

The protective member PR2 was produced by preparing a plate material having a size of 95×42 mm and a plate thickness of 1.0 mm and made of copper (C1100) and bending the plate material to have substantially the same dimensions as those in FIG. 6.

The protective member PR3 was produced by preparing a perforated plate material illustrated in FIG. 9 by using a cation-coated steel plate having a plate thickness of 1 mm and bending the perforated plate material as illustrated in FIG. 9. The protective member PR3 has a surface portion 42PR and three fixing portions 46PR. The surface portion 42PR is a trapezoidal plate-like member. The fixing portion 46PR is a plate-like member provided at a distal end of a protruding portion 44PR protruding from a peripheral edge of the surface portion 42PR toward a side opposite to the Z direction. One fixing portion 46PR is provided at the distal end of the protruding portion 44PR protruding from the peripheral edge of the surface portion 42PR on the X direction side, one fixing portion 46PR is provided at the distal end of the protruding portion 44PR protruding from the peripheral edge of the surface portion 42PR on the side opposite to the X direction, and one fixing portion 46PR is provided at the distal end of the protruding portion 44PR protruding from the peripheral edge of the surface portion 42PR on a Y direction side. In the protective member PR3, a length of an upper base of the trapezoid is about 25 mm, a length of a lower base of the trapezoid is about 45 mm, and a height of the trapezoid is about 76 mm, and a plurality of openings 40PRa having a diameter of about 9 mm are formed in the surface portion 42PR. A width of the fixing portion 46PR (a length of a side not in contact with the protruding portion 44PR) is about 13 mm.

The protective member PR4 was produced by bending an aluminum punching metal having a plate thickness of 0.5 mm, a hole diameter of 05 mm, and a pitch of 8 mm to have substantially the same dimensions as those in FIG. 9. The protective member PR5 was produced by bending a plain-woven stainless steel (SUS304) mesh having a mesh opening of 2.07 mm and a wire diameter of 00.47 mm to have substantially the same dimensions as those in FIG. 9. In order to prevent fraying of the cut surface of the mesh, an outer edge of the mesh was bent by about 3 mm and used.

As illustrated in FIG. 10, the protective member PR6 was produced by boring the opening 40a having a diameter of 47.5 mm at the center of an aluminum (A5052) plate material having a size of 53.5 mm×53.5 mm and a thickness of 2 mm. The protective member PR6 can be used in combination with the protective members PR1 to PR5.

A protective member PR7 is a member in which the functions of the protective member PR3 and the protective member PR6 are combined, and was produced by preparing a perforated plate material illustrated in FIG. 11A by using a cation-coated steel plate having a plate thickness of 1 mm similar to the protective member PR3, and bending the perforated plate material in such a way that two fixing portions 46PR and a surface portion 42PR overlap each other when viewed from the Z direction as illustrated in FIG. 11B. In the protective member PR7, opening portions are formed in the two fixing portions 46PR, and the surface portion 42PR (an opening 40PRa of the surface portion 42PR) is exposed through the opening portions when viewed from the Z direction.

The cover portion was made of ABS (acrylonitrile butadiene styrene copolymer) by a casting method using a simple mold.

Manufacturing of Window Member

Example 1

First, a soda lime glass having a size of 300 mm×300 mm and a thickness of 2.0 mm was prepared to prepare a first glass plate. Another soda-lime glass having a size of 300 mm×300 mm and a thickness of 2.0 mm was prepared to prepare a second glass plate. A laminated glass in which PVB having a thickness of 0.76 mm is arranged between the first glass plate and the second glass plate was prepared. Next, a through hole having a diameter of 53.5 mm was formed at the center of the laminated glass.

Next, a far-infrared transmissive member mounted attachment produced by bonding an attachment and a prepared far-infrared transmissive member using a urethane-based adhesive was attached to the through hole in such a way that an outer surface of the far-infrared transmissive member and a vehicle exterior side surface (first glass plate side surface) of the laminated glass are flush with each other. The attachment is a frame member made of ABS and provided on an outer peripheral edge of the far-infrared transmissive member.

Thereafter, a prepared base bracket was bonded to the laminated glass by using a urethane-based adhesive and a double-sided adhesive tape. Further, the protective member PR1 was bonded to laminated glass by using a urethane-based adhesive and a double-sided adhesive tape in such a way that an overlapping region is 75% when viewed from the direction along the perpendicular line AX illustrated in FIG. 6. An inorganic primer was applied in advance to a glass side and a far-infrared transmissive member side of a target surface to be bonded with the urethane-based adhesive, and an organic primer was applied in advance to an attachment side. The urethane-based adhesive was cured by drying at a normal temperature for five days. After confirming the drying of the urethane-based adhesive, the cover portion was mounted on the base bracket to obtain a window member of Example 1.

Example 2

A window member of Example 2 was obtained in the same manner as in Example 1 except that the protective member PR2 was used.

Example 3

A window member of Example 3 was obtained in the same manner as in Example 1 except that the protective member PR1 was not mounted on the laminated glass.

Example 4

A window member of Example 4 was obtained in the same manner as in Example 3 except that the cover portion was not mounted on the base bracket.

Example 5

A window member of Example 5 was obtained in the same manner as in Example 4 except that a through hole having a diameter of 53.5 mm was formed around a point 100 mm away from the center of the laminated glass toward a side.

Example 6

A window member of Example 6 was obtained in the same manner as in Example 1 except that the protective member PR3 was bonded to the laminated glass via a modified silicone adhesive layer having a thickness of 0.6 mm in such a way that an overlapping region is 100% when viewed from the direction along the perpendicular line AX. FIG. 12 is a schematic view of the window member of Example 6 as viewed from the direction along the perpendicular line AX. That is, FIG. 12 can be said to be a schematic view of the vehicle glass to which the protective member covering 100% of the far-infrared transmissive member is attached when viewed in the vertical direction from the outside of the vehicle.

Example 7

A window member of Example 7 was obtained in the same manner as in Example 6 except that the protective member PR4 was used and bonded to the laminated glass via a urethane-based adhesive layer having a thickness of 3 mm.

Example 8

A window member of Example 8 was obtained in the same manner as in Example 7 except that the protective member PR5 was used.

Example 9

The far-infrared transmissive member mounted attachment was attached to the through hole in the same manner as in Example 1.

Then, the laminated glass and the protective member PR6 were positioned in such a way that the center of the through hole of the laminated glass is aligned with the center of the hole having a diameter of 53.5 mm in the protective member PR6, and a urethane adhesive was applied to a front surface of an end portion of the protective member PR6 to bond the protective member PR6 to the inner side of the laminated glass. The thickness of the adhesive layer was 1 mm. A metal primer was applied in advance to a protective member PR6 side of a target surface to be bonded with the urethane-based adhesive, and an inorganic primer was applied to a glass substrate side.

The urethane-based adhesive was cured by drying at a room temperature for five days to produce a window member with the protective member PR6.

Example 10

First, a through hole having a diameter of 51.5 mm was formed at a center position of the first glass plate. The first glass plate with an opening portion and a chamfered portion was produced by performing finish processing on an inner peripheral surface of the through hole with a roughness #800 to form a through hole having a diameter of 53.5 mm, and then chamfering (C0.5 mm) corners of a boundary portion between an inner peripheral surface of the through hole and a vehicle exterior side surface of the first glass plate and a boundary portion between the inner peripheral surface of the through hole and a vehicle interior side surface of the first glass plate at an angle of 45°.

Next, a through hole having a diameter of 55.5 mm was formed at the center position of the second glass plate. The second glass plate with an opening portion and a chamfered portion was produced by performing finish processing on an inner peripheral surface of the through hole with a roughness #800 to form a through hole having a diameter of 57.5 mm, and then chamfering (C0.5 mm) corners of a boundary portion between an inner peripheral surface of the through hole and a vehicle exterior side surface of the second glass plate and a boundary portion between the inner peripheral surface of the through hole and a vehicle interior side surface of the second glass plate at an angle of 45°.

Next, a laminated glass in which PVB having a thickness of 0.76 mm is laminated between the first glass plate with the opening portion and the chamfered portion and the second glass plate with the opening portion and the chamfered portion is prepared. At this time, when viewed from a thickness direction of the laminated glass, center alignment is made in such a way that the hole with a diameter of 53.5 mm of the first glass plate with the opening portion and the chamfered portion does not enter the inside of an inner periphery of the hole with a diameter of 57.5 mm of the second glass plate with the opening portion and the chamfered portion. After the lamination, the PVB of the opening portion is cut along the through hole having a diameter of 53.5 mm.

Next, a far-infrared transmissive member mounted attachment is attached to the through hole in the same manner as in Example 1.

Then, the laminated glass and the protective member PR6 were positioned in such a way that the center of the through hole of the laminated glass is aligned with the center of the hole having a diameter of 53.5 mm in the protective member PR6, and a urethane adhesive was applied to a front surface of an end portion of the protective member PR6 to bond the protective member PR6 to the inner side of the laminated glass. The thickness of the adhesive was 1 mm. A metal primer was applied in advance to a protective member PR6 side of a target surface to be bonded with the urethane-based adhesive, and an inorganic primer was applied to a second glass plate side.

Figure 13:
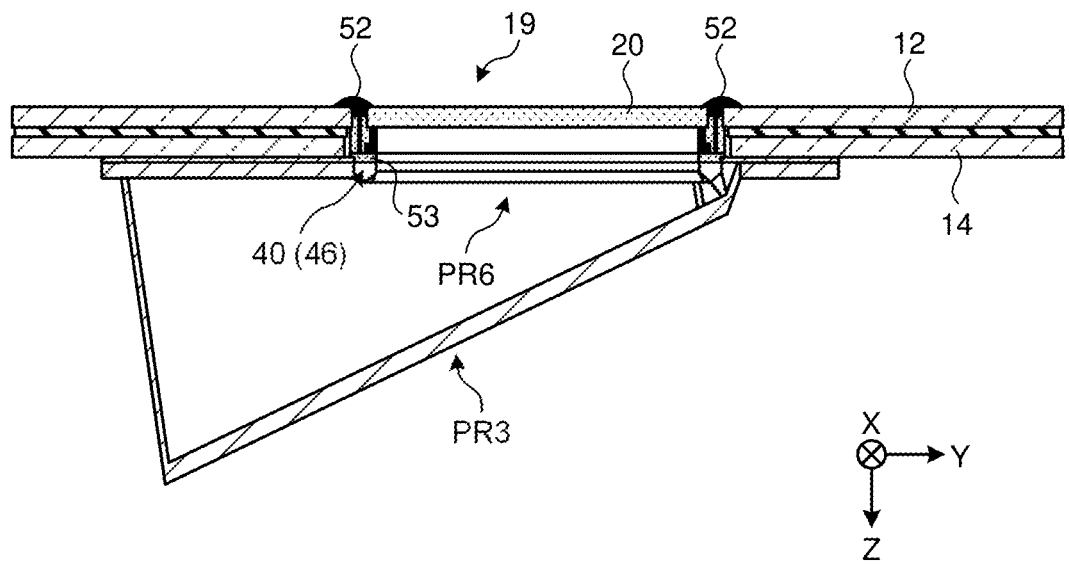
FIG. 13 is a schematic view of a window member having a configuration of Example 10.

Next, as in Example 6, the protective member PR3 was mounted via a modified silicone adhesive layer having a thickness of 0.6 mm to obtain a window member having a configuration illustrated in FIG. 13. FIG. 13 is a schematic view of the window member having the configuration of Example 10. FIG. 13 can be said to be a schematic view in a case where (a part of) another protective member is bonded to the vehicle glass of FIG. 7 and the protective member is divided into two. That is, as illustrated in FIG. 13, in Example 10, it can be said that two protective members PR6 and PR3 are provided.

Example 11

A window member with the protective member PR7 was produced in the same manner as in Example 10 except that the protective member PR7 illustrated in FIGS. 11A and 11B was used. That is, FIGS. 11A and 11B can be said to be a schematic view in a case where the divided protective members in FIG. 13 are integrated. In the protective member PR7, since the protective member PR6 and the protective member PR3 in Example 10 are integrated, the protective member PR7 itself has a high mechanical durability as compared with the window member of Example 10 in which the protective member PR6 and the protective member PR3 are separately bonded to the laminated glass. In addition, the protective member PR7 is firmly bonded to the laminated glass. As a result, the window member of Example 11 has a higher mechanical durability than the window member of Example 10.

The urethane-based adhesive and the modified silicone adhesive were sufficiently cured by drying at a normal temperature for five days.

<Falling Ball Strength Evaluation 1>

The following falling ball strength evaluation was performed using the window members of Examples 1 to 5. Evaluation was performed using a ball falling device and a support frame in accordance with an impact resistance test in JIS R 3211 and 3212:2015.

First, the window member was held in a room at a temperature of 23° C. and a relative humidity of 50% for four hours, and then fixed with the support frame in such a way that an outer side surface (a glass substrate 12 side) faces upward. Then, a 226 g steel ball was dropped from a height of 10 m toward the center of the window member. At this time, it was determined as pass if the steel ball did not penetrate through the window member and the total mass of separated fragments from a side opposite to a surface to which the impact is applied was 15 g or less.

Example 12

Falling ball strength evaluation 1 was performed in the same manner as in Examples 1 to 5 except that the window member of Example 4 was used and the steel ball was dropped toward a point shifted by 30 mm from the center of the window member.

Those that passed all the tests were evaluated as "O (circle)", and those that failed were evaluated as "X (cross)". The evaluation results are shown in Table 1.

(Falling Ball Strength Evaluation 1)

Here, Examples 1 and 2 are examples, Examples 3 and 4 are comparative examples, and Examples 5 and 12 are reference examples. As shown in Table 1, the window members of Examples 1, 2, 5, and 12 passed Falling ball strength evaluation 1, and it was confirmed that it is possible to suppress a colliding object from reaching a driver's seat even if the colliding object comes flying to the vicinity of the central portion of the far-infrared transmissive member.

TABLE 1

|  | Example 1 | Example 2 | Example 3 | Example 4 | Example 5 | Example 12 |
| --- | --- | --- | --- | --- | --- | --- |
| Position of through hole | Center | Center | Center | Center | 100 mm from center | Center |
| Protective member | Protective member PR1 | Protective member PR2 | None | None | None | None |
| Overlapping region [%] | 75 | 75 | 0 | 0 | 0 | 0 |
| Bonding layer | Urethane-based + adhesive tape | Urethane-based + adhesive tape | None | None | None | None |
| Cover | Present | Present | Present | Not present | Not present | Not present |
| Falling ball falling position | Center | Center | Center | Center | Center | 50 mm from center |
| Falling ball strength evaluation | ○ | ○ | X | X | ○ | ○ |

<Falling Ball Strength Evaluation 2>

Falling ball strength evaluation was performed in the same manner as in Falling ball strength evaluation 1 except that the window member of Example 6 was held in a room at 40° C. and a relative humidity of 50% for four hours.

<Falling Ball Strength Evaluation 3>

Falling ball strength evaluation was performed in the same manner as in Falling ball strength evaluation 1 except that the window members of Examples 6 to 8 were held in a room at −20° C. and a relative humidity of 50% for four hours, and then a 226 g steel ball was dropped from a height of 9 m.

<Falling Ball Strength Evaluation 4>

The window member of Example 6 was held in a room at a temperature of 23° C. and a relative humidity of 50% for four hours, and then fixed with the support frame in such a way that an inner side surface (a glass substrate 14 side) faces upward. Next, falling ball strength evaluation was performed in the same manner as in Falling ball strength evaluation 1 except that a 2260 g steel ball was dropped from a height of 4 m toward the center of the window member. At this time, if the steel ball did not penetrate through the window member within five seconds, it was determined as pass.

Those that passed all the tests were evaluated as "○ (circle)", and those that failed were evaluated as "x (cross)". The evaluation results (Falling ball strength evaluations 2 to 4) are shown in Table 2. Examples 6 to 9 are examples. Examples 10 and 11 are reference examples.

As shown in Table 2, the window member of Example 6 passed all of Falling ball strength evaluations 2 to 4, and it was confirmed that it is possible to suppress a colliding object from reaching the driver's seat even if the colliding object comes flying to the vicinity of the central portion of the far-infrared transmissive member under a high temperature condition, a low temperature condition, and a room temperature condition. In addition, the window members of Examples 6 to 8 also passed Falling ball strength evaluation 3 under a low temperature condition where the adhesive force of the adhesive layer is reduced and the window member is easily peeled off, and it was confirmed that it is possible to suppress a colliding object from reaching the driver's seat even if the colliding object comes flying to the vicinity of the central portion of the far-infrared transmissive member under a low temperature condition.

<Thermal Image Visibility Evaluation>

The following thermal image visibility evaluation was performed using the window members of Examples 1, 2, 6 to 10, and 12.

First, the window member was installed in such a way that an angle from a horizontal plane was 30°. Next, the cover portion was removed, and a far-infrared camera (Boson 640 manufactured by FLIR with a horizontal viewing angle

TABLE 2

|  | Example 6 | Example 7 | Example 8 | Example 9 | Example 10 | Example 11 |
|---|---|---|---|---|---|---|
| Position of through hole | Center | Center | Center | Center | Center | Center |
| Protective member | Protective member PR3 | Protective member PR4 | Protective member PR5 | Protective member PR6 | Protective member PR6 + Protective member PR3 | Protective member PR7 |
| Overlapping region [%] | 100 | 100 | 100 | 0 | 100 | 100 |
| Bonding layer | Modified silicone-based | Urethane-based | Urethane-based | Urethane-based | Urethane-based + modified silicone-based | Urethane-based |
| Cover | Not present | Not present | Not present | Not present | Not present | Not present |
| Falling ball falling position | Center | Center | Center | — | — | — |
| Falling ball strength evaluation 2 | ○ | — | — | — | — | — |
| Falling ball strength evaluation 3 | ○ | ○ | ○ | — | — | — |
| Falling ball strength evaluation 4 | ○ | — | — | — | — | — |
| Attachment strength evaluation | — | — | — | 27.8 kgf | — | — |

<Far-Infrared Transmissive Member Attachment Strength Evaluation>

Far-infrared transmissive member attachment strength evaluation was performed using the window member of Example 9.

Figure 14:
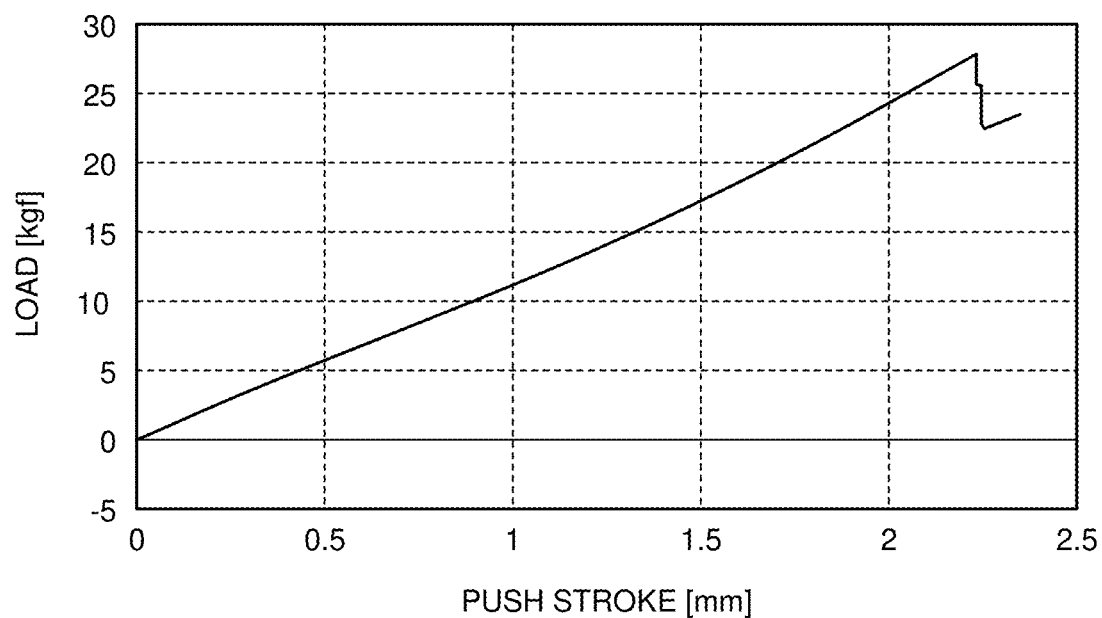
FIG. 14 is a graph of results of far-infrared transmissive member attachment strength evaluation performed using a window member of Example 9.

A load was applied to the central portion of the far-infrared transmissive member at a load speed of 0.033 mm/see through a ring having a diameter of 15 mm while maintaining a range of the outer periphery of the window member of 10 mm. A corner portion of the ring at a portion where the ring comes into contact with the far-infrared transmissive member is subjected to processing (R processing) of rounding the corner with a radius of 0.75 mm. FIG. 14 illustrates results of the far-infrared transmissive member attachment strength evaluation. FIG. 14 is a graph of the results of the far-infrared transmissive member attachment strength evaluation performed using the window member of Example 9. A state in which the window member and the far-infrared transmissive member attachment portion sank due to the load was observed, and the window member was broken from the edge of the hole of the laminated glass at a load of 27.8 kgf. It was confirmed that the window member of Example 9 has a sufficient attachment strength (about 20 kgf) for preventing breakage of the window member due to pressing such as a wind pressure resistance and a hand.

On the other hand, when the laminated glass shown in Example 10 is used, the edge strength of the opening portion is increased, so that the attachment strength can be further increased.

HFOV of) 18° was attached to the base bracket, and then the cover portion was attached. Next, the inside of the compartment was imaged by the far-infrared camera at an outside air temperature of 28° C., and comparison with a thermal image in a case where a visual field of the far-infrared camera was secured and the image quality was not deteriorated or the window member was not interposed was performed. As a result, it was confirmed that the image quality was maintained.

As is apparent from the above results, it was confirmed that, as the protective member is applied, even if a colliding object comes flying to the vicinity of the central portion of the far-infrared transmissive member, the colliding object is suppressed from reaching the driver' seat, and the detection range of the far-infrared camera is not disturbed. Furthermore, it was also confirmed that the attachment strength sufficient for preventing the breakage of the window member can be implemented by applying the protective member.

Although the embodiments of the present invention have been described above, the embodiments are not limited by the contents of the embodiments. In addition, the above-described constituent elements include those that can be easily assumed by those skilled in the art, those that are substantially the same, and those in a so-called equivalent scope. Furthermore, the above-described constituent elements can be appropriately combined. Furthermore, various omissions, substitutions, or changes of the constituent elements can be made without departing from the gist of the above-described embodiments.

REFERENCE SIGNS LIST

1 VEHICLE GLASS
10, 12, 14 GLASS SUBSTRATE
16 INTERMEDIATE LAYER
18 LIGHT SHIELDING LAYER
19 OPENING PORTION
20 FAR-INFRARED TRANSMISSIVE MEMBER
30 COVER PORTION
40 PROTECTIVE MEMBER
42 SURFACE PORTION
CA1 FAR-INFRARED CAMERA
V VEHICLE

The invention claimed is:

1. A vehicle glass comprising:
a light shielding region,
wherein a far-infrared transmitting region in which an opening portion and a far-infrared transmissive member arranged in the opening portion are provided is formed in the light shielding region, and
the vehicle glass further comprises a protective member that is provided on a vehicle interior side of the far-infrared transmissive member and overlaps with at least a part of the far-infrared transmissive member when viewed from a direction orthogonal to a vehicle exterior side surface of the far-infrared transmissive member,
wherein the far-infrared transmissive member comprises a base material comprising at least one selected from the group consisting of Si, Ge, ZnS, and chalcogenide glass; and
wherein the protective member comprises a material having a higher breaking strength than the far-infrared transmissive member.

2. The vehicle glass according to claim 1, wherein the protective member overlaps with a region whose area is 30% or more of an entire region of the far-infrared transmissive member when viewed from the direction orthogonal to the vehicle exterior side surface of the far-infrared transmissive member.

3. The vehicle glass according to claim 1, wherein the protective member overlaps with the entire region of the far-infrared transmissive member when viewed from the direction orthogonal to the vehicle exterior side surface of the far-infrared transmissive member.

4. The vehicle glass according to claim 1,
wherein a far-infrared camera is mounted on the vehicle interior side of the far-infrared transmissive member, and
the protective member is provided on a vehicle exterior side of the far-infrared camera at a position not overlapping with a detection range of the far-infrared camera.

5. The vehicle glass according to claim 4,
wherein the protective member includes a surface portion overlapping with the far-infrared transmissive member, a protruding portion, and a fixing portion, and is fixed to a vehicle interior side surface of the vehicle glass via the fixing portion, and
the surface portion is provided to be inclined with respect to the far-infrared transmissive member in such a way as to be away from the far-infrared transmissive member as a distance to the far-infrared camera decreases.

6. The vehicle glass according to claim 4, wherein in the protective member, a width of a surface portion overlapping with the far-infrared transmissive member decreases as the distance to the far-infrared camera decreases.

7. The vehicle glass according to claim 4, further comprising a cover portion that is provided on the vehicle interior side of the far-infrared transmissive member and houses the protective member and the far-infrared camera.

8. The vehicle glass according to claim 1, wherein the material of the protective member is one selected from stainless steel, an aluminum alloy, a copper alloy, a rolled steel plate, and a fiber-reinforced resin.

9. The vehicle glass according to claim 1,
wherein the protective member is fixed to the vehicle interior side surface of the vehicle glass via an adhesive layer, and
the adhesive layer contains a cured product of a urethane-based adhesive or a silicone adhesive.

10. The vehicle glass according to claim 1, wherein the far-infrared transmissive member is provided with a frame member on an outer peripheral edge, and attached to the opening portion via the frame member.

11. The vehicle glass according to claim 1, wherein an area of the opening portion in a vehicle exterior side surface is smaller than an area of the opening portion in a vehicle interior side surface.

12. The vehicle glass according to claim 1, wherein the vehicle glass is a laminated glass in which a first glass substrate provided on a vehicle exterior side and a second glass substrate are laminated.

13. The vehicle glass according to claim 12, wherein an area of the opening portion in the second glass substrate is larger than an area of the opening portion in the first glass substrate.

14. The vehicle glass according to claim 12, wherein chamfered portions are provided at a boundary portion between the opening portion and a vehicle interior side surface of the first glass substrate, a boundary portion between the opening portion and a vehicle exterior side surface of the first glass substrate, a boundary portion between the opening portion and a vehicle interior side surface of the second glass substrate, and a boundary portion between the opening portion and a vehicle exterior side surface of the second glass substrate.

15. A vehicle glass manufacturing method comprising:
boring an opening portion that penetrates through each of a first glass substrate and a second glass substrate in a thickness direction;
chamfering a boundary portion between the opening portion and a vehicle interior side surface of the first glass substrate, a boundary portion between the opening portion and a vehicle exterior side surface of the first glass substrate, a boundary portion between the opening portion and a vehicle interior side surface of the second glass substrate, and a boundary portion between the opening portion and a vehicle exterior side surface of the second glass substrate;
positioning the opening portion of the first glass substrate and the opening portion of the second glass substrate, and then bonding the first glass substrate and the second glass substrate with an intermediate layer interposed therebetween to obtain a laminated glass;
installing a far-infrared transmissive member in the opening portion; and
installing a protective member overlapping with at least a part of the far-infrared transmissive member when viewed from a direction orthogonal to a vehicle exterior side surface of the far-infrared transmissive member on a vehicle interior side of the far-infrared transmissive member, wherein the far-infrared transmissive member comprises a base material comprises at least one selected from the group consisting of Si, Ge, ZnS, and chalcogenide glass, and wherein the protective member comprises a material having a higher breaking strength than the far-infrared transmissive member.

16. A vehicle glass comprising:

a light shielding region, wherein a far-infrared transmitting region in which an opening portion and a far-infrared transmissive member arranged in the opening portion are provided is formed in the light shielding region, and the vehicle glass further comprises a protective member that is provided on a vehicle interior side of the far-infrared transmissive member and overlaps with at least a part of the far-infrared transmissive member when viewed from a direction orthogonal to a vehicle exterior side surface of the far-infrared transmissive member, wherein:

the far-infrared transmissive member comprises a base material comprises at least one selected from the group consisting of Si, Ge, ZnS, and chalcogenide glass; and the protective member comprises a surface portion overlapping with the far-infrared transmissive member, a protruding portion, and a fixing portion, and is fixed, via the fixing portion, to a vehicle interior side surface of the vehicle glass via an adhesive layer.

17. The vehicle glass according to claim 16, wherein, the adhesive layer comprises a cured product of a urethane-based adhesive or a silicone adhesive.

18. The vehicle glass according to claim 16, wherein, the vehicle glass is a laminated glass in which a first glass substrate provided on a vehicle exterior side and a second glass substrate are laminated.

19. The vehicle glass according to claim 18, wherein, an area of the opening portion in the second glass substrate is larger than an area of the opening portion in the first glass substrate.

20. The vehicle glass according to claim 16, wherein, an opening is formed in the surface portion of the protective member.

* * * * *